US011720916B2

(12) United States Patent
Kitts et al.

(10) Patent No.: US 11,720,916 B2
(45) Date of Patent: *Aug. 8, 2023

(54) SYSTEM AND METHOD FOR ATTRIBUTING MULTI-CHANNEL CONVERSION EVENTS AND SUBSEQUENT ACTIVITY TO MULTI-CHANNEL MEDIA SOURCES

(71) Applicant: ADAP.TV, Inc., New York, NY (US)

(72) Inventors: Brendan Kitts, Seattle, WA (US); Brian Burdick, Newcastle, WA (US); Dyng Au, Seattle, WA (US); Liang Wei, Seattle, WA (US); Amanda Powter, Seattle, WA (US)

(73) Assignee: ADAP.TV, INC., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/443,517

(22) Filed: Jul. 27, 2021

(65) Prior Publication Data

US 2021/0357976 A1 Nov. 18, 2021

Related U.S. Application Data

(63) Continuation of application No. 14/321,385, filed on Jul. 1, 2014, now Pat. No. 11,107,116, which is a (Continued)

(51) Int. Cl.
*G06Q 30/02* (2012.01)
*G06Q 30/0242* (2023.01)
(Continued)

(52) U.S. Cl.
CPC ..... *G06Q 30/0246* (2013.01); *G06Q 30/0241* (2013.01); *G06Q 30/0242* (2013.01);
(Continued)

(58) Field of Classification Search
CPC .......... G06Q 30/0246; G06Q 30/0241; G06Q 30/0242; G06Q 30/0243; G06Q 30/0254; G06Q 30/0269; G06Q 30/0272
See application file for complete search history.

(56) References Cited

U.S. PATENT DOCUMENTS 6,286,005 B1 9/2001 Cannon
8,046,797 B2 10/2011 Bentolila et al.
(Continued)

OTHER PUBLICATIONS

University of Chicago Press, "Patterns, Thinking and Cognition" Howard Margolis (Year: 1988).*

(Continued)

*Primary Examiner* — Breffni Baggot
(74) *Attorney, Agent, or Firm* — Bookoff McAndrews, PLLC

(57) ABSTRACT

This paper presents a practical method for measuring the impact of multiple marketing events on sales, including marketing events that are not traditionally trackable. The technique infers which of several competing media events are likely to have caused a given conversion. The method is tested using hold-out sets, and also a live media experiment for determining whether the method can accurately predict television-generated web conversions.

19 Claims, 25 Drawing Sheets

Media Matching / Analytics Architecture

Related U.S. Application Data continuation of application No. 13/221,851, filed on Aug. 30, 2011, now Pat. No. 8,768,770.

(60) Provisional application No. 61/378,299, filed on Aug. 30, 2010.

(51) Int. Cl.
  *G06Q 30/0241* (2023.01)
  *G06Q 30/0251* (2023.01)
  *G06Q 30/0272* (2023.01)

(52) U.S. Cl.
  CPC ..... *G06Q 30/0243* (2013.01); *G06Q 30/0254* (2013.01); *G06Q 30/0269* (2013.01); *G06Q 30/0272* (2013.01)

(56) References Cited

U.S. PATENT DOCUMENTS

| | | |
|---|---|---|
| 8,046,798 B1 | 10/2011 | Schlack et al. |
| 8,352,980 B2 | 1/2013 | Howcroft |
| 2003/0101451 A1 | 5/2003 | Bentolila et al. |
| 2008/0114624 A1* | 5/2008 | Kitts ............... G06Q 30/0248 705/14.47 |
| 2008/0201731 A1 | 8/2008 | Howcroft |
| 2008/0235088 A1 | 9/2008 | Weyer et al. |
| 2009/0030780 A1 | 1/2009 | York et al. |
| 2009/0144801 A1 | 6/2009 | Grouf et al. |
| 2009/0150227 A1* | 6/2009 | Hummel ............... G06Q 30/02 705/7.33 |
| 2010/0231239 A1 | 9/2010 | Tateishi et al. |
| 2011/0040616 A1 | 2/2011 | Kannan et al. |
| 2011/0166940 A1 | 7/2011 | Bangera et al. |
| 2011/0231239 A1 | 9/2011 | Burt et al. |
| 2011/0231243 A1 | 9/2011 | Bhatia et al. |
| 2011/0246267 A1 | 10/2011 | Williams et al. |
| 2011/0295680 A1 | 12/2011 | Shaw |
| 2011/0307326 A1 | 12/2011 | Hsiao et al. |
| 2011/0307328 A1* | 12/2011 | Crites ............... G06Q 30/0201 706/54 |
| 2012/0004978 A1* | 1/2012 | Kothari ............... G06Q 30/02 705/14.42 |
| 2012/0046996 A1 | 2/2012 | Shah et al. |
| 2012/0185899 A1 | 7/2012 | Riedl et al. |
| 2017/0199920 A1* | 7/2017 | Pearson ............... H04L 67/02 |

OTHER PUBLICATIONS

Richard O. Duda, Pattern Classification and Scene Analysis Chapter 11 (Year: 1995).*
Attribution of Conversion Events to Multi-Channel Media, Brendan Kitts, 2010 IEEE Int'l Conf on Data Mining (Year: 2010).*
Duda and Hart "Pattern Classification" (Year: 2000).*
"Lucid Insiders." Lucid Commerce company blog, posted Jul. 2, 2010 to Mar. 27, 2011, 19 pp. Retrieved from the Internet: http://blog.lucidcommerce.com , accessed Dec. 8, 2011.
Arora, N., et al. "Putting one-to-one marketing to work: Personalization, customization, and choice." Marketing Letters, 2008, vol. 19, pp. 305-321.
Art1 and Pattern Clustering by Barbara Moore, MIT (1989).
Attribution of Conversion Events to Multi-Channel Media, Brendan Kitts, 2010 IEEE International Conference on Data Mining (2010).
Bax, E. and Romero, J. "Comparing Predicited Prices in Auctions for Online Advertising." Technical Report, Caltech, 2009, pp. 1-27. Retrieved from the Internet: http://www.jnromero.com/research/papers/Comparing%20Predicted%20Prices.pdf.
Briggs, R. and Hollis, N. "Advertising on the Web: Is There Response before Click-Through?" Journal of Advertising Research, Mar./Apr. 1997, pp. 33-45.
Brooks, N. "How Much are You Paying for Your Customers' Navigational Behavior?" Atlas Institute Digital Marketing Insight, 2007, pp. 1-5. Retrieved from the Internet: http://www.atlassolutions.com/uploadedFiles/Atlas/Atlas_Institute/Published_Content/dmi-NavigationalSearch.pdf.
Chandler-Pepelnjak, J. "Measuring ROI beyond the Last Ad." Atlas Institute Digital Marketing Insight, 2009, pp. 1-6. Retrieved from the Internet: http://www.atlassolutions.com/uploadedFiles/Atlas/Atlas_Institute/Published_Content/dmi-MeasuringROIBeyondLastAd.pdf.
Chandler-Pepelnjak, J. and Song, Y.B. "Optimal Frequency—The Impact of Frequency on Conversion Rates." Atlas Institute Digital Marketing Insights, 2003, pp. 1-4. Retrieved from the Internet: http://www.atlassolutions.com/uploadedFiles/Atlas/Atlas_Institute/Published_Content/OptFrequency.pdf.
Chorianopoulos, K., Lekakos, G., and Spinellis, D. "The Virtual Channel Model for Personalized Television." Proceedings of the 1st EuroTV Conference: From Viewers to Actors, 2003, pp. 59-67.
Danaher, P. and Green, B. "A Comparison of Media Factors that Influence the Effectiveness of Direct Response Television Advertising." Journal of Direct Marketing (now Journal of Interactive Marketing), vol. 11, No. 2, 1997, pp. 46-58.
Duda and Hart "Pattern Classification" (1995).
Duda and Hart "Pattern Classification" (2000).
Google "CPA Performance Trends on the Google Content Network," Google Inc., 2008, 7 pp. Retrieved from the Internet: http://www.google.com/ads/research/gcnwhitepaper/whitepaper.pdf.
Google adWords Blog. "New CPA bidding product available," Sep. 24, 2007, 1 p. Retrieved from the Internet: http://adwordsblogspot.com/2007/09/new-cpa-bidding-product-available.html.
Google adWords Help. "What is the Conversion Optimizer and how does it work?" 2007, 1 p. Retrieved from the Internet: http://adwords.google.com/support/aw/bin/answer.py?hi=en&answer=60150.
IAB, "IAB Click Measurement Guidelines," 2009, 28 pp. Retrieved from the Internet: http://www.iab.net/media/file/click-measurement-guidelines2009.pdf.
IAB, "IAB Impression Measurement Guidelines," 2005, 20 pp. Retrieved from the Internet: http://www.iab.net/media/file/US_meas_guidelines.pdf.
Kitts, B. "adCenter Annouces new Conversion Tracking Options," adCenter Blog, Microsoft Advertising, Mar. 16, 2009, 9 pp. Retrieved from the Internet: http://community.microsoftadvertising.com/blogs/advertiser/advertiser/archive/2009/03/16/adcenter.
Kitts, B., and LeBlanc, B. "Optimal Bidding on Keyword Auctions." Electronics Markets—The International Journal of Electronic Commerce and Business Media, vol. 14, No. 3, 2004, pp. 186-201.
Kitts, B., Freed, D., and Vrieze, M. "Cross-sell: A fast, promotion-tunable recommendation method based on conditionally independent probabilities." Sixth ACM SIGKDD International Conference on Knowledge Discovery and Data Mining, Boston, Aug. 20-23, 2000, 10 pp.
Kitts, B., Wei, L., Au, D., Powter, A., Burdick, B. (2010). "Attribution of Conversion Events to Multi-Channel Media." Proceedings of the Tenth IEEE International Conference on Data Mining, Dec. 14-17, 2010, IEEE Computer Society Press, pp. 881-886.
Kitts, B., Wei, L., Au, D., Zlomek, S., Brooks, R., Burdick, B. (2010). "Targeting Television Audiences using Demographic Similarity." Applications of Data Mining and Modeling in Government and Industry Workshop (ADMMG12010) in Workshop Proceedings of the Tenth IEEE International Conference on Data Mining (ICDM), IEEE Computer Society Press, pp. 1391-1399.
Kokernak, M. "What's Television's Next Business Model?" Media Post Daily News, Mar. 17, 2010, 3 pp. Retrieved from the Internet: http://www.mediapost.com/publications/?fa=Articles.showArticle&art_aid=124424.
Leaders, "In Praise of Television: The great survivor," The Economist, Apr. 29, 2010, 2 pp. Retrieved from the Internet: http://www.economist.com/node/16009155/print.
Lekakos, G. and Giaglis, G.M. "A Lifestyle-Based Approach for Delivering Personalized Advertisements in Digital Interactive Television." Journal of Computer-Mediated Comminications, vol. 9, Issue 2, Jan. 2004, 14 pages.

(56) References Cited

OTHER PUBLICATIONS

Lowen, I. "Direct Marketers Increase Use of TV, Radio." National Underwriter, Jul. 19, 1986, pp. 10-11, 26.

Microsoft Advertising adCenter Help. "Microsoft adCenter click Measurement: Description of Methodology (DOM)." [last retrieved on Aug. 27, 2010] 1 p. Retrieved from the Internet: http://adcenterhelp.microsoft.com/Help.aspx?market=en-US&project=adCenter_live_Std&querytype=topic&query=MOONSHOT_CONC_ClickMethod.htm.

Moe, W. and Fader, P. "Dynamic Conversion Behavior at E-Commerce Sites." Management Science, vol. 50, No. 3, Mar. 2004, pp. 326-335. Retrieved from the Internet: http://citeseerx.ist.psu.edu/viewdoc/download?doi=10.1.1.23.1139&rep=rep1&type=pdf.

Non-Final Office Action from related U.S. Appl. No. 13/209,346, dated Apr. 12, 2013, 11 pages.

Non-Final Office Action from related U.S. Appl. No. 13/209,353, dated Jun. 6, 2013, 17 pages.

Non-Final Office Action from related U.S. Appl. No. 13/221,865, dated Aug. 1, 2013, 22 pages.

Rey, B. and Kannan, A. "Conversion Rate Based Bid Adjustment for Sponsored Search Auctions." Yahoo! Labs Technical Report No. YL-2010-002, In Proceedings of the 19th International World Wide Web Conference, 2010, 14 pp.

Richard O. Duda, Peter E. Hart, David G. Stork, Pattern Classification, 2nd Edition, Wiley, 2000.

Rimm-Kaufman, A. "PPC and Your Good Name: Sales From Brand Searches Aren't Incremental," May 27, 2007, 9 pp. Retrieved from the Internet: http://searchengineland.com/ppc-and-your-good-name-sales-from-brand-searches-arent-incremental-10825.

Sculley, D., Malkin, R.G., Basu, S., and Bayardo, R.J. Predicting bounce rates in sponsored search Sculley, D., Malkin, R.G., Basu, S., and Bayardo, R.J. "Predicting bounce rates in sponsored search advertisements," In Proceedings of the 15th ACM SIGKDD International Conference on Knowledge Discovery and Data Mining, Jun. 28-Jul. 1, 2009, Paris, France, pp. 1325-1333. Retrieved from the Internet: http://kissen.informatik.unidortmund.de/PROCEEDINGS/SIKDD2009/docs/p1325.pdf.

Smyth, B. and Cotter, P. "A Personalized Television Listings Service," Communications of the ACM, vol. 43, No. 8, Aug. 2000, pp. 107-111.

Spangler, W., Gal-Or, M., and May, J. "Using data mining to profile TV viewers." Communications of the ACM, vol. 46, Issue 12, Dec. 2003, pp. 66-72.

Spencer, S. "Google deems Cost Per Action the Holy Grail." CNET News, Aug. 22, 2007, 2 pp. Retrieved from the Internet: http://news.cnet.com/8301-13530_3-9764601-28.html.

Strong, E. "Search Conversion Rates by Daypart." Atlas Digital Marketing Insight, 2009, 4 pp. Retrieved from the Internet: http://www.atlassolutions.com/uploadedFiles/Atlas/Atlas_Institute/Published_Content/Search%20Conversion%20Rates%20by%20Daypart.pdf.

Sutton, R.S. and Barto, A.G., Reinforcement Learning: An Introduction. Cambridge, MA: The MIT Press, 1998, Chapter 7, 32 pp. Retrieved from the internet: http://webdocs.cs.ualberta.ca/~sutton/book/the-book.html.

Tellis, G., Chandy, R., MacInnes, D., and Thaivanich, P. "Modeling the Microeffects of Television Advertising: Which Ad Works, When, Where, for How Long, and Why?" Marketing Science 24(3), pp. 351-366 © 2005 Informs.

University of Chicago Press, "Patterns, Thinking and Cognition" Howard Margolis (1988).

Wiley, Encyclopedia of Computer Science and Engineering (2009).

\* cited by examiner

```
76219121|30|STY1|1|WKBW|BUFFALO,NY|2|7/2/2008 6:05|-5|8008768156|-1|||-1|0|3
76219112|120|STY2|1|WKBW|BUFFALO,NY|2|7/2/2008 6:05|-5|8008768156|-1|||-1|0|3
76509063|30|STY4|1|WSBK|BOSTON,MA|2|7/4/2008 12:00|-5|8005951927|-1|www.webaddress.com|-1|0|4
76512444|60|STY4|1|WSBK|BOSTON,MA|2|7/4/2008 12:00|-5|8005951927|-1|www.webaddress.com|-1|197.4|4
76547095|120|STY3|1|KRON|SAN FRANCISCO,CA|2|7/4/2008 20:00|-8|8005938224|-1|www.webaddress.com|-1|0|4
76506696|30|STY4|1|XHAB|BROWNSVILLE,TX|2|7/5/2008 14:00|-6|8005951927|-1|www.webaddress.com|-1|188|4
76509047|30|STY4|1|WNUV|BALTIMORE,MD|2|7/5/2008 15:30|-5|8005952118|-1|-1|526.4|2
76509118|60|STY4|1|WTVZ|NORFOLK,VA|2|7/5/2008 16:00|-5|8005953110|-1|-1|310.2|2
76482379|120|STY3|1|WCSC|CHARLESTON,SC|2|7/5/2008 17:30|-5|8005938224|-1|-1|408.9|3
```

Sample Media Plan Data

*FIG. 1.1*

"Encoding Id","Market","Rank","Station","Channel","Affiliate","Start Date","Start Time","Stop Date","Stop Time","Start Second","Stop Second","Seconds","Program","ISCI-20","Campaign","Advertiser","Product Name","Module Code","Phone Number","Length","Donovan Agency Estimate Code","Donovan Agency Advertiser Code","Donovan Agency Product Code",
"0000708920","BANGOR","154","WFVX","022","FOX","20100714","14:30:05","20100714","14:58:33","0000000030","0000001738","0000001835","PAID PROGRAM","PMSON001","SON2010","POSITEC USA","SONICRAFTER","1710","9999999999","1710","XXXX","XXXX","XXXX"

Sample Verification Data

```
15552836|1|07/20/2008 13:30|-5|59535|v.32|635|25|4|8008195404|WAXN|330|STY6|||JOHN SMITH|15155 REDROAD CT||CHARLOTTE|NC|28273|US|||||404|6412622|jsmith@yahoo.com|100.00|2.50|1.50|Y|N
15567168|1|07/20/2008 13:31|-5|60420|v.32|282|25|4|8008195404|WRNN|330|STY6||||||||||||||||||||||||||||||
15533396|1|07/20/2008 13:31|-5|52137|v.32|270|25|5|8008195404|WRNN|330|STY6||||||||||||||||||||||||||||||
15559953|1|07/20/2008 13:32|-5|66488|v.32|913|25|6|8009874524|HGTVC|330|STSC|||JOE|SAMPLE|1891FEATHER LIGHT WAY||WINDSOR|ON|N9H2E6|CA|||||519|5641186|joesample@hotmail.com|25|2.5|.5|N|N
15579765|1|07/20/2008 13:34|-5|3104|v.32|553|25|6|8008195404|WAXN|330|STY6|||ERICA|TESTLASTNAME|4814 TEST AVE||CHARLOTTE|NC|28205|US||||||704|5375838|etestlastname@aol.com|100.00|2.50|1.50|Y|Y
15585913|1|07/20/2008 13:35|-5|62707|v.32|1441|25|6|8008195404|WRNN|330|STY6|||AMANDA|JONES|63 E. BLACKBOX STREET||DOVER|NJ|07801|US|amanda|jones|123 Main Ave||Portland|ME|04103|US|973|4429729|30.00|2.50|1.50|Y|N
15540393|1|07/20/2008 13:35|-5|76294|v.32|81|25|4|8008195404|WRNN|330|STY6||||||||||||||||||||||||||||||
15585919|1|07/20/2008 13:36|-5|67793|v.32|1356|25|2|8008195404|WAXN|330|STY6|||JOHN|DOE|921 TASSO AVE||KANNAPOLIS|NC|28083|US||||||931|9381878|25.00|2.50|.50|N|N
15585943|1|07/20/2008 13:37|-5|68041|v.32|103|25|4|8008195404|WRNN|330|STY6||||||||||||||||||||||||||||||
15540442|1|07/20/2008 13:38|-5|50392|v.32|365|300|4|8008195404|WAXN|330|STY6|||JANE|DOE||||||||||||||||||||||
```

Sample Callcenter Data

*FIG. 1.4*

```
09032000009MLH9AH-EC|02/01/2009 00:00|-7|www.samplewebsite.com|Unassigned|Jane|Doe|1234 Main St||BALTIMORE|MD|21224|US|John|Doe|4321 Main Ave||BALTIMORE|MD|21224|US|410|3827626|janedoe_1234@hotmail.com||100.00|2.50|1.50|Y|N
09032000141MT2QAH-EC|02/01/2009 00:01|-7|www.samplewebsite.com|ca-1|Jane|Doe|1234 Main St||WASHINGTON|MO|63090|US|||||||||100.00|2.50|1.50|Y|N
09032000146MN95AH-EC|02/01/2009 00:01|-7|www.samplewebsite.com|ca-1|Jane|Doe|1234 Main St||STONE MOUNTAIN|GA|30083|US||||STONE MOUNTAIN|GA|30083|US|678|4997605|janedoe_1234@hotmail.com|100.00|2.50|1.50|Y|Y
09032000236MLH9AH-EC|02/01/2009 00:02|-7|www.samplewebsite.com|ca-1|Jane|Doe|1234 Main St||WEST DES MOINES|IA|50266|US||||WEST DES MOINES|IA|50266|US|515|2746587|janedoe_1234@hotmail.com|25.00|2.50|1.50|N|N
09032000758MKSRAH-EC|02/01/2009 00:07|-7|www.samplewebsite.com|ca-1|Jane|Doe|1234 Main St||BALTIMORE|MD|21201|US|||||MD|21201|US|||25|0|1|N|N
09032000857538ER-EC|02/01/2009 00:08|-7|www.samplewebsite.com|ca-2|Jane|Doe|1234 Main St||BALTIMORE|MD|21201|US|||||21201|US|||25|0|1|Y|Y
09032001051MKSRAH-EC|02/01/2009 00:10|-7|www.samplewebsite.com|Unassigned|Jane|Doe|1234 Main St||BALTIMORE|MD|21201|US|||||US||||100.00|2.50|1.50|Y|N
09032001213MKSRAH-EC|02/01/2009 00:12|-7|www.samplewebsite.com|Unassigned|Jane|Doe|1234 Main St||BALTIMORE|MD|21201|US|||||21201|US|410|3827626||100.00|2.50|10.50|Y|N
09032001344538ER-EC|02/01/2009 00:13|-7|www.samplewebsite.com|Unassigned|Jane|Doe|1234 Main St||LANCASTER|CA|93534|US||||LANCASTER|CA|93534|US|661|9405051|janedoe_1234@hotmail.com|100.00|2.50|10.50|Y|N
09032001719417SER-EC|02/01/2009 00:17|-7|www.samplewebsite.com|Unassigned|Jane|Doe|1234 Main St||FRESNO|CA|93650|US||||FRESNO|CA|93650|US|559|2928228|janedoe_1234@hotmail.com|30.00|2.50|1.50|Y|N
```

Sample E-Commerce Data

*FIG. 1.5*

00001893|02/14/2009 00:00|0|119.80|39.90|0.00|0.00|159.70|N|N|830|10763251|00001893|JIM|DOE|260 TRIAL DR||BLOOMINGDALE|GA|31302-4058|US|912|5551172||00001893|JOHN|DOE|260 TRIAL DR||BLOOMINGDALE|GA|31302-4058|US|912|6755172|
00001894|02/14/2009 00:00|0|149.70|55.80|0.00|0.00|205.50|N|N|830|10763256|00001894|JANE|DOE|114 TEST DR||SPRINGFIELD|GA|31329-4642|US|912|6559332||00001894|JANE|DOE|406 BILLINGADDRESS AVE||GUYTON|GA|31312-4538|US|912|5559332|

Sample Order Data

*FIG. 1.6*

```
85189|JOHN|DOE|111 TEST
WAY|SEATTLE|WA|91045|35|M|D|1|0|0|1|0|323|23|234|1|5|1|1|0|0|1|0|0|0|1|0|1|1|43|Y|7|0|1|1|1|0|
32|1|1|0|1|1|0|7|X|1|1|1|0|1|0|1|1|1|1|1|0|0|1
85189|JANE|SMITH|111 TEST
WAY|SEATTLE|WA|91045|35|M|D|1|0|0|1|0|323|23|234|1|5|1|1|0|0|1|0|0|0|1|0|1|1|43|Y|7|0|1|1|1|0|
32|1|1|0|1|1|0|7|X|1|1|1|0|1|0|1|1|1|1|1|0|0|1
```

Sample Consumer Data Enrichment

*FIG. 1.7*

"03072010","0035","WABC","ABC","FPB","0060","Syndicated","Lost","","Live Together, Die Alone","",",","Drama","Jack Bender","","","Naveen Andrews","Henry Ian Cusick","Emilie de Ravin","Michael Emerson","Matthew Fox","Jorge Garcia","Jack and Sayid devise a plan to confront the Others and get Walt back; Eko and Locke fight over the decision about the button and the hatch","","Closed Captioned","ESP,Part 1 of 2","","","In Stereo","",",","14","","v"

"03072010","0135","WABC","ABC","FPB","0115","Movie","Spliced","","","*+","2002","Horror","Gavin Wilding","","","Canada","Ron Silver","Liane Balaban","Drew Lachey","Melissa Repka","","","A teenager watches a scary movie, then realizes the deformed killer from the film is stalking her","","","","","R","Adult language, adult situations, violence","",","

"03072010","0330","WABC","ABC","FPB","0030","Syndicated","Storm Stories","","","","","","","","","","Weather","","Jim Cantore","","","","","","","","","","","True accounts of life-threatening, weather-related events","","Closed Captioned","","","","In Stereo","",",","PG","", "03072010","0400","WABC","ABC","FPB","0030","Instructional","Ron Hazelton's HouseCalls","","","","","","","","","","Educational","","Ron Hazelton","","","","","","","","","","","Redefining an oversized living room into two more livable spaces using knee walls and columns; blending a hardwood floor","","Closed Captioned","","","","In Stereo","",",","G",""

"03072010","0430","WABC","ABC","FPB","0030","Syndicated","Storm Stories","","","","","","","","","","Weather","","Jim Cantore","","","","","","","","","","","True accounts of life-threatening, weather-related events","","Closed Captioned","","","","In Stereo","",",","PG","", "03072010","0500","WABC","ABC","FPB","0060","Special","Road to Gold: An Academy Award Preview","","","","","","","","","","Entertainment","","Sandy Kenyon","","","","","","","","","","","A preview of the Oscars presentation","","Closed Captioned","","","","In Stereo","",",","PG","", Sample Guide Data

*FIG. 1.8*

| Runtime | Property | ProductPurchasedKey | ZipCode | NetCustomerValue | PanelisitID | AgeInTwo-YearIncrements-1stIndividualID | BusinessOwners@HomeIndicatorID | CharitableGivingScoreID | ChildNearHighSchoolGraduationInHHID |
|---|---|---|---|---|---|---|---|---|---|
| 1899-12-30 14:30:00.000 | CRT5 | 400 | 97152 | $100.00 | 10101 | 18 | NULL | 83 | NULL |
| 1899-12-30 11:00:00.000 | TRUTV | 400 | 87152 | $37.00 | 10102 | 17 | NULL | 43 | NULL |
| 1899-12-30 11:00:00.000 | TRUTV | 400 | 48313 | $321.00 | 10104 | NULL | NULL | 45 | NULL |
| 1899-12-30 06:00:00.000 | WWJ | 400 | 73737 | $12.31 | 10105 | 19 | NULL | 46 | NULL |
| 1899-12-30 16:30:00.000 | UP1 | 400 | 97152 | $19.95 | 10106 | 12 | NULL | 21 | NULL |
| 1899-12-30 11:30:00.000 | REELZ | 400 | 87152 | $119.32 | 10114 | 24 | NULL | 94 | NULL |
| 1899-12-30 06:30:00.000 | FOOD | 400 | 78252 | $37.15 | 10112 | 21 | NULL | 42 | NULL |
| 1899-12-30 09:30:00.000 | KTTV | 400 | 48313 | $231.11 | 10110 | 17 | NULL | 94 | NULL |
| 1899-12-30 08:30:00.000 | WDCA | 400 | 73737 | $901.11 | 10106 | 18 | NULL | 69 | NULL |

Sample Viewer Panel Data

*FIG. 1.9*

Phone orders (top) versus web orders (bottom) for project 10031. x-axis is hour.

| Resp-onse key | Spot key | Time diff | Spot viewer-ship | Demo dist | Geo-dist | High-phone-period | Correct spot for response |
|---|---|---|---|---|---|---|---|
| 1 | 2 | 10 | 1000 | 0.5 | 1 | 0.1 | 1 |
| 1 | 3 | 100 | 1000 | 0.6 | 0 | 0.2 | 0 |
| 1 | 4 | 60 | 2000 | 0.4 | 0 | 0.0 | 0 |
| 1 | 5 | 40 | 1000 | 0.4 | 0 | 0.2 | 0 |

Example Spot Prediction Problem

*FIG. 3*

| Variable | z-score |
|---|---|
| Gender-InputIndividualID | -3.45 |
| Reading-FinancialNewsletterSubscribers | 3.21 |
| Apparel-Men's-BigandTall-C | 2.38 |
| Donation/Contribution-C | 1.97 |
| DogOwner | 1.62 |
| SeniorAdultinHouseholdID | 1.61 |
| Woodworking | 1.57 |
| Collectibles-Antiques | 1.54 |
| Hunting/Shooting | 1.52 |
| Gardening-C | 1.49 |
| Golf | 1.38 |
| SportsandLeisure-SC | 1.32 |
| OutdoorsGrouping | 1.29 |
| Arts | 1.19 |
| Smoking/Tobacco | 1.18 |

Demographic Profile for Do It Yourself Channel

*FIG. 4*

Relationship between viewership of television spot and responses. x-axis is an airing's proportion of viewing audience, and y-axis is proportion of responses that are properly due to that airing.

(Left) x-axis is minutes rounded to 2-minute intervals. y-axis is probability / proportion of responses that occur this number of minutes after the airing. (Right) x-axis is minutes rounded to 10 minute intervals.

| variablename | corr |
|---|---|
| cumprobprop | 0.3121 |
| probprop | 0.3491 |
| viewerprop | 0.3326 |
| geoprob | -0.0006 |
| demo_pct_rankdist | 0.0177 |
| demo_pct_rankdist_prop | 0.0258 |
| demo_dist | -0.0076 |
| Thishour pct telephone response orig1 | 0.0038 |
| Yesterday pct telephone response orig1 | -0.0055 |
| timediff | -0.1081 |
| cumprob | 0.2578 |
| prob | 0.286 |
| Viewers | 0.2253 |

Variable Correlations

*FIG. 8*

| Fail | Test Details |
|---|---|
| 1 | Web response dates truncated to hour is 56.77%. |
| 0 | Null, Unkonwn or Regional market names 7.27%. |
| 1 | Stations sharing TFNs is 92.16%. |
| 0 | Web orders outside of 1.5 ITQ is 8.05%. |
| 1 | Airings missing a matched market is 68.66%. |

Example Validation Tests

*FIG. 9*

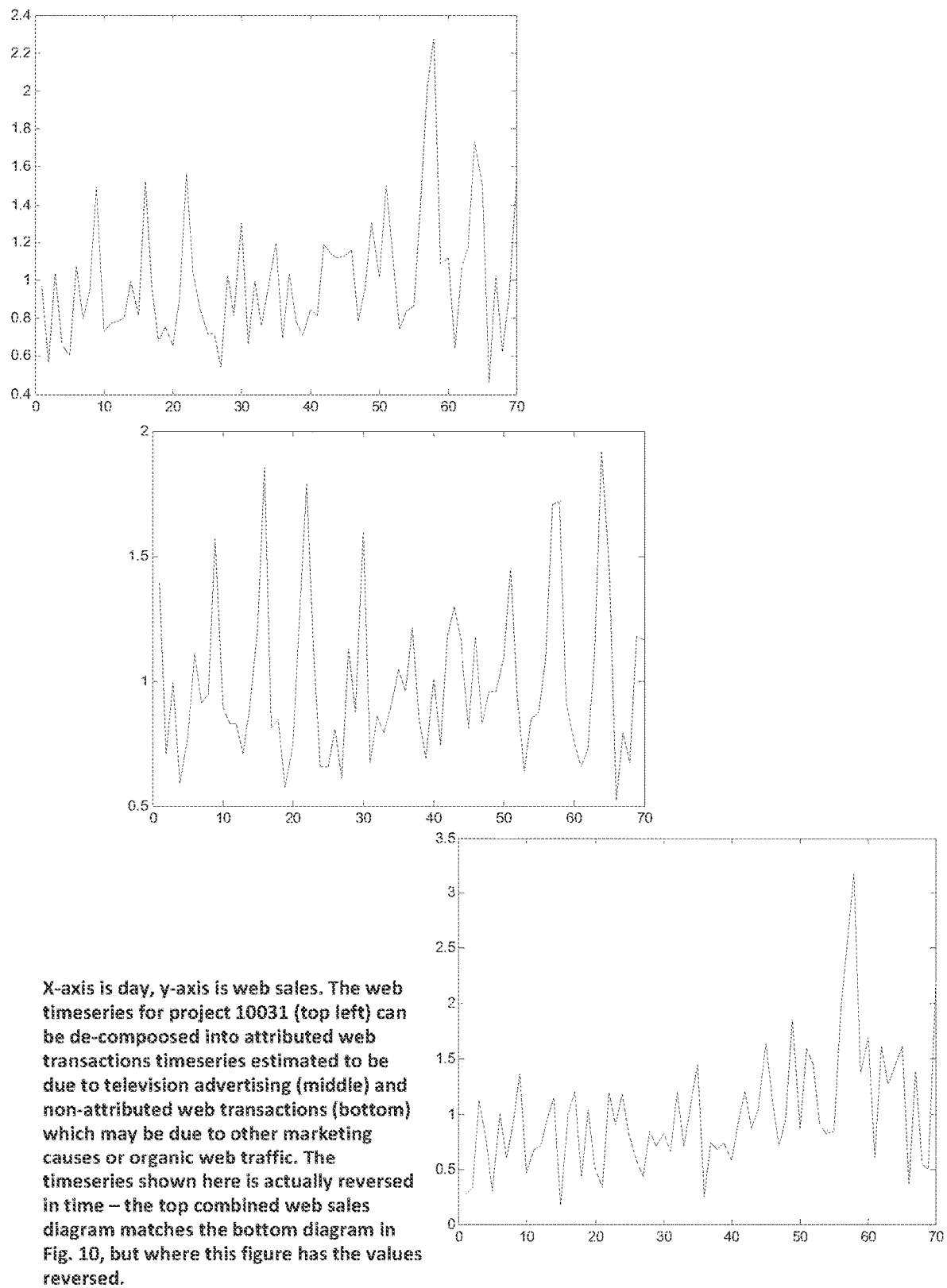

X-axis is day, y-axis is web sales. The web timeseries for project 10031 (top left) can be de-compoosed into attributed web transactions timeseries estimated to be due to television advertising (middle) and non-attributed web transactions (bottom) which may be due to other marketing causes or organic web traffic. The timeseries shown here is actually reversed in time – the top combined web sales diagram matches the bottom diagram in Fig. 10, but where this figure has the values reversed.

*FIG. 11*

Project 10031 web timeseries broken into attributed and un-attributed web sales and analyzed using Fourier analysis and Auto-correlation. Top subplot is the timeseries, middle is the Fourier periodogram, bottom is an auto-correlation plot. (Top) Attributed timeseries does not show any 7 day pattern. (Bottom) Un-attributed web sales show a strong 7 day period.

| Project Key | Date Start | Date End | Phone - Web R | Web Attrib % |
|---|---|---|---|---|
| 10010 | 7/29/2009 | 5/5/2009 | 0.9399 | 95% |
| 10020 | 6/22/2009 | 3/30/2009 | 0.9448 | 90% |
| 10031 | 5/9/2010 | 2/8/2010 | 0.8880 | 34% |
| 10023 | 5/20/2010 | 4/2/2010 | 0.5427 | 10% |

Attribution Rates for 4 Projects

*FIG. 13*

Web orders in targeted DMAs compared to control DMAs which did not have television advertising. In the experimental markets, web sales increased by around 16x. We can use this behavior to calculate a correct attribution rate during the experiment – clearly most of the web sales during the experimental period were due to the television advertising.

The Response table used in production joins to a special AttributionPrediction table which contains new response, spot mappings.

SYSTEM AND METHOD FOR ATTRIBUTING MULTI-CHANNEL CONVERSION EVENTS AND SUBSEQUENT ACTIVITY TO MULTI-CHANNEL MEDIA SOURCES

CROSS-REFERENCES

This application is a continuation of and claims the benefit of priority to U.S. application Ser. No. 14/321,385, filed on Jul. 1, 2014, which is a continuation of and claims the benefit of priority to U.S. application Ser. No. 13/221,851, filed Aug. 30, 2011, now U.S. Pat. No. 8,768,770, which claims the benefit under 35 USC § 119 of U.S. Provisional Patent Application No. 61/378,299, filed Aug. 30, 2010, which are hereby incorporated by reference in their entirety.

This application is related to co-pending U.S. application Ser. No. 13/209,346, entitled, "METHOD AND SYSTEM FOR AUTOMATICALLY TARGETING ADS TO TELEVISION MEDIA USING DEMOGRAPHIC SIMILARITY" filed Aug. 12, 2011, and co-pending U.S. application Ser. No. 13/209,353, entitled, "METHOD AND SYSTEM FOR AUTOMATICALLY DETERMINING DEMOGRAPHICS OF MEDIA ASSETS FOR TARGETING ADVERTISEMENTS", filed Aug. 12, 2011, both of which are hereby incorporated by reference in their entirety.

BACKGROUND

Brief definitions of several terms used herein follow, which may be helpful to certain readers. Such definitions, although brief, will help those skilled in the relevant art to more fully appreciate aspects of the invention based on the detailed description provided herein. Such definitions are further defined by the description of the invention as a whole and not simply by such definitions.

| | |
|---|---|
| Media Asset instance | A specific impression, airing, or advertising event. For example, a media asset may be CNN-Monday through Friday. An Asset instance of this asset may be CNN-Tuesday-8:05pm-AC360. |
| Media asset | Advertising media that can be published for purposes of advertising. Examples include television airing, radio spot, newspaper spot, internet publisher page. For example, a television media asset may comprise some combination of station-geography-program-day-hours such as WXGN-Florida-SixO'ClockNews-Monday-6pm, or may be a more general set such as FOX-Monday through Friday. |
| Asset | Same as media asset |
| Media | Same as media asset |
| Station | Same as media asset |
| Station-Program | Same as media asset |
| Station-Program-Day-Hour | Same as media asset |
| Product | Something that is being sold by an advertiser. The product and advertisement are used interchangeably - each product is assumed to have one or more advertisements that can be aired on television media. The contents of the advertisement are considered part of the product for the present system in order to simplify the description. |
| Advertisement | Same as Product |
| Spot | Same as media asset instance. Often "spot" is a term used for TV advertising which is one of the embodiments. |
| Placement | Same as media asset instance. "Placement" is often used for TV advertising which is one of the embodiments. |

Television is an incredibly successful medium. The average American spent almost 37 hours a week watching television in 2009—this is over twice time spent online (Leaders, (2010), In Praise of Television: The great survivor, The Economist, April 2010). Yet at the same time television presents formidable challenges in measuring and optimizing television advertising. Customers almost always view ads on TV and convert through other channels including web and retail stores. This is a fundamental problem. Kokernak (2010) suggests that "until we can develop cross-platform metrics, additional new business models for television will be nearly impossible to establish." Kokernak, M. (2010), What's Television's Next Business Model? Media Post Daily News, Wednesday, Mar. 17, 2010 http://www.media-post.com/publications/?fa=Articles.showArticle&art_aid=124424

A. Conversion Tracking

Introductions to online conversion tracking systems can be found at Google adWords Help, (2007a), What is Conversion Optimizer and How Does it Work?http://adwords.google.com/support/aw/bin/answer.py?hl=en&answer=60150, and Kitts, B. (2009), adCenter Announces new Conversion Tracking Options, adCenter Blog, Mar. 16, 2009. This ability to track has allowed for the development of automated systems for bidding and managing Cost-per-Action CPA goals (Kitts, B., LeBlanc, B. (2004), Optimal Bidding on Keyword Auctions, Electronic Markets—The International Journal of Electronic Commerce and Business Media, Vol. 14, No. 3; Google, (2008), CPA Performance Trends on the Google Content Network, Google Inc., http://www.google.com/ads/research/gcnwhitepaper/whitepaper.pdf; Google, 2007a; Google adWords Blog, (2007b), New PPA Bidding Product Available, September 2007).

The most common industry approach for understanding who is viewing the advertisements is the use of viewer panels. These are volunteer users who allow their activities to be monitored. The Nielsen panel contains 25,000 users (out of approximately 114.5 million television households) and so the Nielsen sample is less than 0.022% of population. This small sample size creates a significant challenge for some products which have smaller sales—or where the audience being sought after is much smaller, such as elite credit card customers. The panel may simply not have enough users who buy the product to make reliable inferences about television spot performance—or it may have some information for broadcast channels, but lacking information for local stations and cable.

Other techniques for tracking TV include embedding special offers, phone numbers or vanity URLs into the advertisement. When a customer calls in to order, the company can uniquely identify the airing which the customer viewed because they use the phone number, URL, or redeem the offer. Linking keys have limited applications since only a small fraction of the population will ultimately use the embedded key—often customers convert without these tracking devices.

B. Credit Assignment

After marketing events have been tracked, the next problem is to determine which of the tracked events "caused" a customer to convert. Although statistics technically may not be able to answer the ultimate question of causality, approaches such as Structural Equation modeling are typically used for inferring relatedness of advertising to customer sales. Algorithms such as TD-Lambda (Sutton and Barto, 1998) maintain statistics on success likelihoods conditional upon events, and assign credit backwards in time after a positive event such as a conversion. Sutton and Barto (1998), Reinforcement learning: An Introduction, MIT Press http://webdocs.cs.ualberta.ca/~sutton/book/the-book.html.

These statistics can then be used to infer precedents with the greatest chance of bringing about a conversion. "Engagement mapping" which has been proposed by Atlas and aims to assign credit to multiple preceding events, can be seen as an application of TD-Lambda style credit assignment. Last ad Click conversions can also be considered a subset of reinforcement learning theory.

C. Cross-Modal Conversions

A variety of studies have begun to look into the problem of multi-modal conversion tracking, and specifically have called into question web-based conversion tracking numbers. Brooks et al. (2009) noted that 71% of conversions in clients of the Atlas system were from navigational queries. Brooks, N. (2009), Paying for Navigational Search, Atlas Digital Media Insights, http://www.atlassolutions.com/uploadedFiles/Atlas/Atlas_institute/Published_ContentIdmi-NavigationalSearch.pdf. Rimm-Kaufman (2007) noted that 50% of clicks may be on brandname keywords. Rimm-Kaufman, A. (2007), PPC And Your Good Name: Sales From Brand Searches Aren't Incremental May 27, 2007 http://searchengineland.com/ppc-and-your-good-name-sales-from-brand-searches-arent-incremental-10825. This is suggestive that customers already know about the product and so had essentially been acquired through a different marketing event or offer. Chandler-Pepelnjak (2009) also noted that assigning credit to the last click ignores all other channels that may be bringing about the conversion. Chandler-Pepelnjak, J. (2009), Measuring ROI beyond the Last Ad, Atlas Digital Marketing Insights, http://www.atlassolutions.com/uploadedFiles/Atlas/Atlas_Institute/Published Content/dmi-NavigationalSearch.pdf.

BRIEF DESCRIPTION OF THE DRAWINGS

FIG. 1.1 shows sample media plan data. This is the data that is produced by media buyers purchasing media to run in the future. This includes what station the commercial will run on, what advertiser, what creative, what the media cost associated with the purchased data is, what individual phone numbers and web address will be associated to the commercial for tracking purposes.

FIG. 1.2 is the data that is generated by 3P party verification services. These services watermark commercials and then monitor when the media was run across all TV stations. This is analogous to a web pixel server in online advertising. The purpose of this data feed is to verify that the media that was purchased actually ran.

FIG. 1.3 is the sample trafficking instructions/order confirmation sent to stations. This is confirmation of what was purchased and instructs the stations when to run which commercial creatives (advertiser's 30 second media asset). This can also tell the station to a/b test across multiple versions of a creative, etc.

FIG. 1.4 shows sample call center data. This data is critical record the phone responses to phone numbers displayed in the commercial creatives. Essentially each phone number is unique to each commercial or station and time.

FIG. 1.5 shows sample e-commerce data. This data is for orders that came on an advertiser's website. This data shows the customer information and time the orders came in.

FIG. 1.6 shows the actual order data that is placed in the advertiser or retailers system. This data is final purchase record and is typically updated with subsequent purchases for subscriptions, bad debt collection problems, and returns.

FIG. 1.7 shows a sample of consumer data enrichment. Typically this is a wide array of hundreds of attributes about consumers from the various data bureaus. This includes demographics, psychographics, behavioral information (such as recent purchases), household information, etc.

FIG. 1.8 shows sample program guide data. This is the data of the programming that is going to be run in the future on individual stations in terms of time, program name, program type, stars, and general text description.

FIG. 1.9 shows sample audience panel data. This data is from a rollup of previous purchasers and their associated demographics, psychographics, etc from FIG. 1.7. Alternatively, this could also come from set top box data appended with the same sets of attributes or other existing viewer panels.

FIG. 3 shows data for an example advertisement spot prediction.

FIG. 4 shows a demographic profile for the DIY Network.

FIG. 8 shows a table of correlations determined for different variables.

FIG. 9 shows a table of example validation tests.

FIG. 11 shows three graphs of web sales as a function of time elapsed after the airing of a television spot.

FIG. 13 shows a table of attribution rates for four different media attribution projects.

DETAILED DESCRIPTION

Internet-based conversion tracking systems have knowledge of every Internet based media event to which a customer was exposed, and each Internet based conversion event, and can link them uniquely. The present system does not replicate that functionality, but instead provides for conversion attribution in the case in which one or more of the media events that have successfully been delivered to the customer and may have led to a conversion are unknown. Thus, there are multiple media events, any of which might have caused the conversion. For example, a conversion event may take place via an ecommerce website or an offline conversion channel (e.g., physical store) after a number of online and offline advertisements have run.

Figure 2:
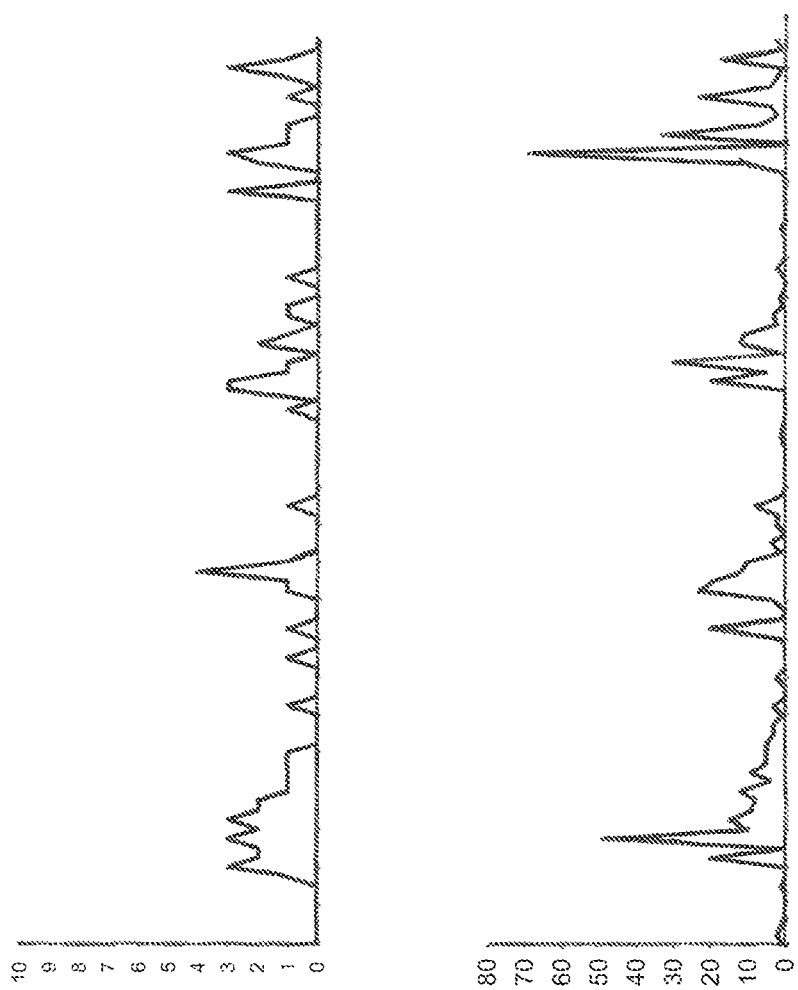
FIG. 2 shows a comparison of phone orders and web orders for a product over time.

A real-life example of measuring and tracking the effects of television advertising is shown in FIG. 2. The top graph shows phone responses resulting from a television commercial (where people used the telephone number shown in the advertisement), and the bottom graph shows web responses for the same product. Almost all of the web transactions are occurring due to television advertising, yet there is no tracking technology available that can associate the web conversions with the television broadcast. Without visibility into these effects marketer have enormous difficulty managing their television advertising.

Described below is a system and method for inferring attribution between a set of competing media events. The system and method test using hold-out sets, and also a live media experiment in which to test whether the method can accurately predict television-generated web conversions. The method may be implemented in a television media tracking system and provides for fully automated analysis of media impact.

Aspects of the present invention relate in general to methods and data processing systems, and readable media, and more particularly, to methods of attributing conversions to media events based on analysis of the characteristics of the media and conversions, and data processing system readable media having software code for carrying out those methods.

In one implementation, media events and conversion events are recorded separately. For some portion of these events, there may be conversions for which the media event that generated it is known. The system takes these known cases and infers a probability model that predicts, for any other conversion event, the probability of it being generated by different media events. Using this model the system can create a probabilistic attribution for every conversion. This attributed set of conversions to media can then be used in order to track and optimize media based on the conversions that it is believed to be generating.

Some aspects of the invention described herein are as follows:
1. Automated method for attributing conversions to media.
2. Method does not rely upon individualized person or user-based tracking systems (which are used for online conversion tracking for example—e.g. cookie-based tracking of user views, clickthroughs and conversions).
3. It instead analyzes the demographics, time, and other characteristics of the conversion, and calculates the probability that this was due to one of several media events.
4. This is by nature a method that preserves customer privacy.
5. The method can be applied to any set of media and conversions, as long as the attributes of each are properly recorded.
6. The method is particularly useful in traditional advertising domains such as television in which individualized or user-based tracking technologies are not currently available, and so there is a need to identify where conversions originated from so that this media can be improved and optimized.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be, interpreted in any restricted manner will be overtly and specifically defined as such in this Detailed Description section.

I. System Architecture

Figure 1:
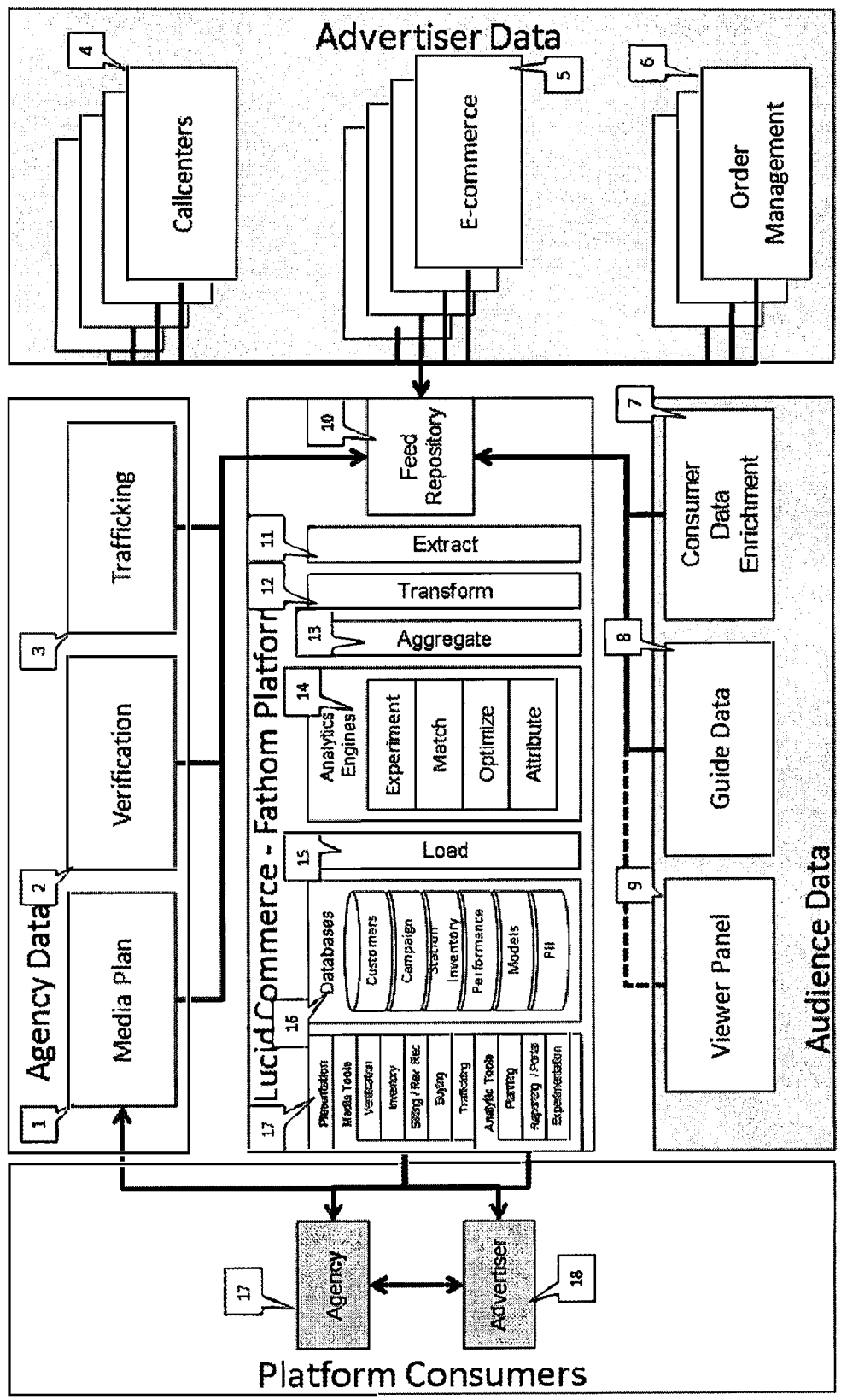
FIG. 1 shows the overall system architecture for Integrating the various sets of data, internal processing components and platform consumers.

Prior to being able to do response modeling and detailed targeting for television media, a large amount of system infrastructure must be in place. FIG. 1 and the following discussion provide a brief, general description of a suitable computing environment in which the invention can be implemented. Although not required, aspects of the invention are described in the general context of computer-executable Instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Step 1: Setup Data Feeds with Media Agency

A first step is to ensure all the data about what media is being purchased, running, and trafficked to stations is collected to ensure that there is an accurate representation of the television media. This includes setting up data feeds for.
  a. Media Plan Data (FIG. 1.1)
  b. Media Verification Data (FIG. 1.2)

c. Trafficking/Distribution Data (FIG. 1.3)

Step 2: Setup Data Feed with Callcenter

A second step is to ensure there is accurate data about the callers that called into specific phone numbers from the call center and it is important to get the call center onboarded with a data feed (FIG. 1.4).

Step 3: Setup Data Ecommerce Vendor Datafeeds

A third step is to setup recurring data feeds with the vendor or internal system of the advertiser that records orders that come in from the advertiser's website (FIG. 1.5)

Step 4: Step Data Order Processing/Fulfillment Data Feed

A fourth step is to setup recurring data feeds with the order vendor or internal system that physically handles the logistics of billing and/or fulfillment. This Is important for subsequent purchases such as subscriptions and for returns/bad debt, etc to accurately account for revenue. This may also come from a series of retail Point of Sale system (FIG. 1.6).

Step 5: Setup Audience Data Enrichment Data Feed with Data Bureau

A fifth step is to ensure that every caller, web-converter, and ultimate purchaser has their data attributes appended to their record in terms of demographics, psychographics, behavior, etc (FIG. 1.7). Examples of Data Bureau's are Experian, Acxiom, Claritas, etc.

Step 8: Setup Data Feed with Guide Service

A sixth step is to ensure that the forward looking guide service data is ingested into the system. This is the programming of what is going to run on television for the weeks ahead (FIG. 1.8).

Step 7: Setup Data Feed for Panel Data Enrichment

Either through the purchasers' of products on television, set top box viewer records, or existing panels it is helpful to get a feed of viewer/responder data that has the same demographic, psychographic, behavioral data appended to that is being appended to the advertiser's purchaser data in Step 5 (FIG. 1.9).

Step 8: Ingest all Data into Staging System

In step 8, all of the underlying data is put into production and all of the data feeds setup from Steps 1-7 are loaded into an intermediate format for cleansing, adding identifier's, etc. Personally Identifiable Information (PI) Is also split and routed to a separate pipeline for secure storage. (FIG. 1, Callouts 10-11)

Step 9: Run Business Logic/Models for Matching Responses and Orders to Media

In step 9, all of the data from the data feeds has been ingested into the system at the most granular form. Here the phone responses are matched up to the media that generated it. The e-commerce orders are matched using statistical models to the media that likely generated them, (FIG. 1, Callouts 12-14).

Step 10: Load Data into Final Databases

In step 10, the data is aggregated and final validation of the results is automatically completed. After this, the data is loaded into the databases for use with any of the upstream media systems. These include the ability to support media planning through purchase suggestions, revenue predictions, pricing suggestions, performance results, etc (FIG. 1, Callouts 15-16).

Step 11: Use Data in Presentation Layer

In step 11, all of the data becomes accessible to the operators of various roles in the media lifecycle. This includes graphical tools for media planning (where the targeting in this application primarily fits), optimization, billing, trafficking, reporting, etc (FIG. 1, Callout 17).

II. System Inputs and Outputs

The user provides the following information:

A. Inputs

1. Media events (e.g., television airing at a particular time, on a particular station, within a particular geography). This may comprise Media Verification Data (FIG. 1.2) which is a list of verified television media airings.
2. Conversion events (e.g., a customer who visits a website and decides to buy a product; or a customer that goes to a retail store and buys a product). This may comprise Order Fulfillment Data (FIG. 1.6) which is a list of customer purchase events including the person's shipping information, or Ecommerce Data (FIG. 1.5) which is a list of customer web purchase events and the customer's shipping information.

B. Outputs

1. A tuple "Response" which indicates the probability that a particular conversion event was caused by a particular media event. Response(MediaEvent, ConversionEvent, Probability).

III. Solution Definition

Let $s_i$ be the ith spot or media event instance. A spot instance is an advertisement, such as on Oct. 10, 2009 there was an airing at 8:30 pm on FOX for a particular advertisement. Each media event has the following attributes a) Date
b) product that was advertised
c) media cost amount
d) geography or market (e.g., Boston vs Philadelphia)
e) advertising creative, which is the actual video that was shown.

Let $r_j$ be a response or purchase event. Each response event has a variety of attributes including a) Date
b) Customer
c) address (e.g., Pleasant Street, Philadelphia)
d) phone number
e) credit card
f) email
g) product that was purchased,
h) sale amount
i) other information, e.g., transcripts, and so on The attribution problem is, for each response r, to associate it with the correct spot s that generated it. This is represented as the following tuple:

$$\text{Response}=(\text{Responsekey}, \text{Spotkey})$$

Where Responsekey is a primary key and so only appears once. The spotkey is an originating spot and multiple responses may be assigned to a single spot.

In general the system can solve this problem by estimating the conditional probabilities and then selecting the most probable spot.

$$s_j : \max Pr(s_j|r_i) \text{ where}$$

$$r_{id} >= s_{jd}$$

$$w < r_{id} - s_{jd} < W$$

$$r_{ip} = s_{jp},$$

where w is a minimum time frame and W is a maximum time frame between the airing of the spot and a sale, The system may have added some constraints above to help to ensure that the problem can be solved in a computationally efficient manner and which are also standard methodology for click counting (IAB, 2005; IAB, 2009).

1. The spot event can occur earlier in time than the response event.

2. The sale can occur within a certain timeframe W, such as 30 days. In online advertising it is very typical to utilize a cookie expiration window, usually 7, 30, or more days, in order to avoid significant data processing challenges. The sale should also occur at least w after the airing, which could be called a "refractory period" for responses.
3. The response event should be for the same product p that was advertised.

IV. Training Set

In order to attribute responses to spots, the system may need at least some responses which are known to be linked to spots—i.e. where the attribution is known. This can be done in the following ways:

1. A special URL is created and seeded into the advertisement and only used for the television advertisement. For example if the product is Joe's Shoes then a URL can be created which is http:/www.GetJoesShoes.com/ If a user accesses this URL then they are linked to the television broadcast.
2. An offer can be added to the advertisement. The offer may be for some economically valuable amount. For example, the offer may be Contact JoesShoes today, and use the offer code "FleetFeet" and receive 10% off! Whenever someone uses this code they are linked to the television broadcast.
3. A unique toll-free phone number (TFN) is seeded into the television advertisement. If anyone uses toll free phone number then they are linked to the specific television airing.
4. Volunteer Panel viewers—if they are available and if they have been recorded as viewing the program—can in some cases be tracked to determine if they buy the targeted product after seeing the television airing.

Typically only a small number of viewers use the linking keys, and so in the next section a method for identifying the cross-channel conversions is provided.

V. Methodology

The methodology proceeds as follows:
1. Take known response, TV media spot pairs including the attributes of each
2. Divide into training and test set
3. Train model based on spot-response attributes to predict originating spot
4. Execute on responses to attribute to most likely spot
5. If probability is too low, then attribute to unknown.
6. Validate against external information and statistical relationships VI. Model The machine learning problem is to train a model to predict, based on demographic distance, spot viewership, time difference between spot and response, the probability that this response-spot pairing is correct. A wide variety of models can be used for this problem Including logistic regression and neural networks. A logistic regression is shown below $$Pr(r_i | s_j) = \frac{1}{1 + e^{-\sum_k R_k r_{i,k} - \sum_l S_l s_{j,l} - \sum_m + C_m c_{i,j,m} - A}}$$

where $r_{i,k}$ are features of the response, $s_{j,k}$ are features of the spot, and $c_{j,k}$ are features of the response-spot pair, and $R_k$, $S_i$, $C_m$, $A$ are estimated using maximum likelihood or another parameter estimation technique.

An example of the prediction problem is shown in the table in FIG. 3. Response 1 occurred, and there were 4 possible spots that may have been responsible for it, labeled with a unique spot key. The column labeled 'Time diff' indicates that the 4 spots range in time from 10 minutes before the response to 100 minutes before the response. 'Spot viewership' is the number of television households in the area where the media event ran where impressions are predicted and is the same for all four spots.

'Demo dist' is the demographic vector distance between the response, a person buying a product, and the media event which can also be defined by a demographic vector distance. Values for the demo dist are normalized to be between 0 and 1. The demo dist is a measure of how similar or dissimilar the demographic of the person buying the product and the demographic of the media event. In one embodiment, a correlation coefficient can be used instead of the demo dist. For example, if media was run on the TV Channel "Adult Swim", and a customer responded to the advertisement 5 minutes after it ran, and that customer's demographics were "young", "male", "high school education", then the probability that the customer came from that TV channel would be higher since their demographics match that of typical "Adult Swim" viewers. Likewise if the customer who responded was over 80 then the probability would decrease.

'Geo dist' is a measure of the distance between the media event and the person responding to the media event. For example, one of the spots, spot key 2, aired in the same geographic region as the response, as indicated by a geo distance of 1, while the other three spots have been assigned a geo distance of 0 because the responder is not in the same geographic region as the media event. While binary geo dist is used for this particular problem, the geo dist value for the spots can be any value between 0 and 1, inclusive.

'High phone period' is a normalized measure of how many phone calls are received at a particular time. This measure factors in the likelihood that people are calling in organically, rather than in response to an advertisement. For example, if a television spot airs at midnight and no phone calls are typically received at that particular time. Then if a phone call is received after the spot airs at midnight, it is more likely to be related to the midnight ad.

The 'correct spot for response' identifies whether a spot is the "correct" spot for this response (correct spot=1). In this case, spot key 2 has been identified as being the spot that caused the telephone response. Ground truth cases are the events that are clearly causally linked to a media event because there is nothing else in time that was close enough to have caused the response. The information for the response to spot key 2 in the table in FIG. 3 can thus be used as a ground truth case for training the system to recognize responses that are linked to a media event.

A. Drag Orders

Several modifications are needed to ensure that the prediction problem is practical. Toll-free numbers (TFNs) are often unique for a television station, however different numbers tend not to be given for separate airings on the same station. Therefore, if an advertisement displays on a station like FOX once at noon and again at 3 pm, and a direct response occurs at 3:30 pm, the same toll free number is being used for each spot. It is likely that the response is due to the airing at 3 pm. However there is a small chance that the response is due to the airing at noon. This phenomenon is referred to in the television industry as "drag orders". In order to solve this problem a technique has been developed for the system that is referred to as the "Lone Spot" method. Drag orders can only exist if multiple airings occur in a short period of time. Therefore, cases were identified where only a single Spot aired within W hour period such as 24 hours. This allows the system to create probabilities for response after airing.

B. Partial Attribution

Throughout this disclosure the most probable media event that caused a response will be the target, as this makes for easy reporting and analysis. In online advertising, similar simplifications are used. The most common conversion tracking simplification has been called by some authors "The Last Ad Standard" (Chandler-Pepelnjak, 2009). This is done by attributing the conversion to the most recent ad-click from that user, where the ad and the conversion page are both owned by the same advertiser. Under this standard, one and only one event also receives credit for the conversion.

However other view or click events may have been related to the ultimate decision to convert (Biggs and Hollis, 1997). In the machine learning literature reinforcement learning methods such as Q-learning routinely assign credit to multiple earlier events (Sutton and Barto, 1998). In online advertising Atlas refers to "engagement mapping" (Chandler-Pepelnjak, 2009) to assign credit backwards in time to several originating click events.

Partial conversions can be supported by the present model. The model above predicts conditional probabilities for each of many events and selects the maximum. These probabilities can be retained for partial attribution. The schema which stores the response-spot mappings can also be modified slightly such that (a) the mapping is changed to 1:M so that multiple spots can be associated with the response, and (b) probability is added to the schema to show the relative weighting for each of the media events in bringing about the response.

VII. Variables

A variety of variables are available to predict the probability of the response being conditionally dependent upon the spot.

A. Geography

Television advertising airings sometimes are localized by geography, and other times are national in nature. When the airings are localized by geography, it is possible to significantly de-weight the probability of a response if it occurs outside of the geographic area.

Figure 5:
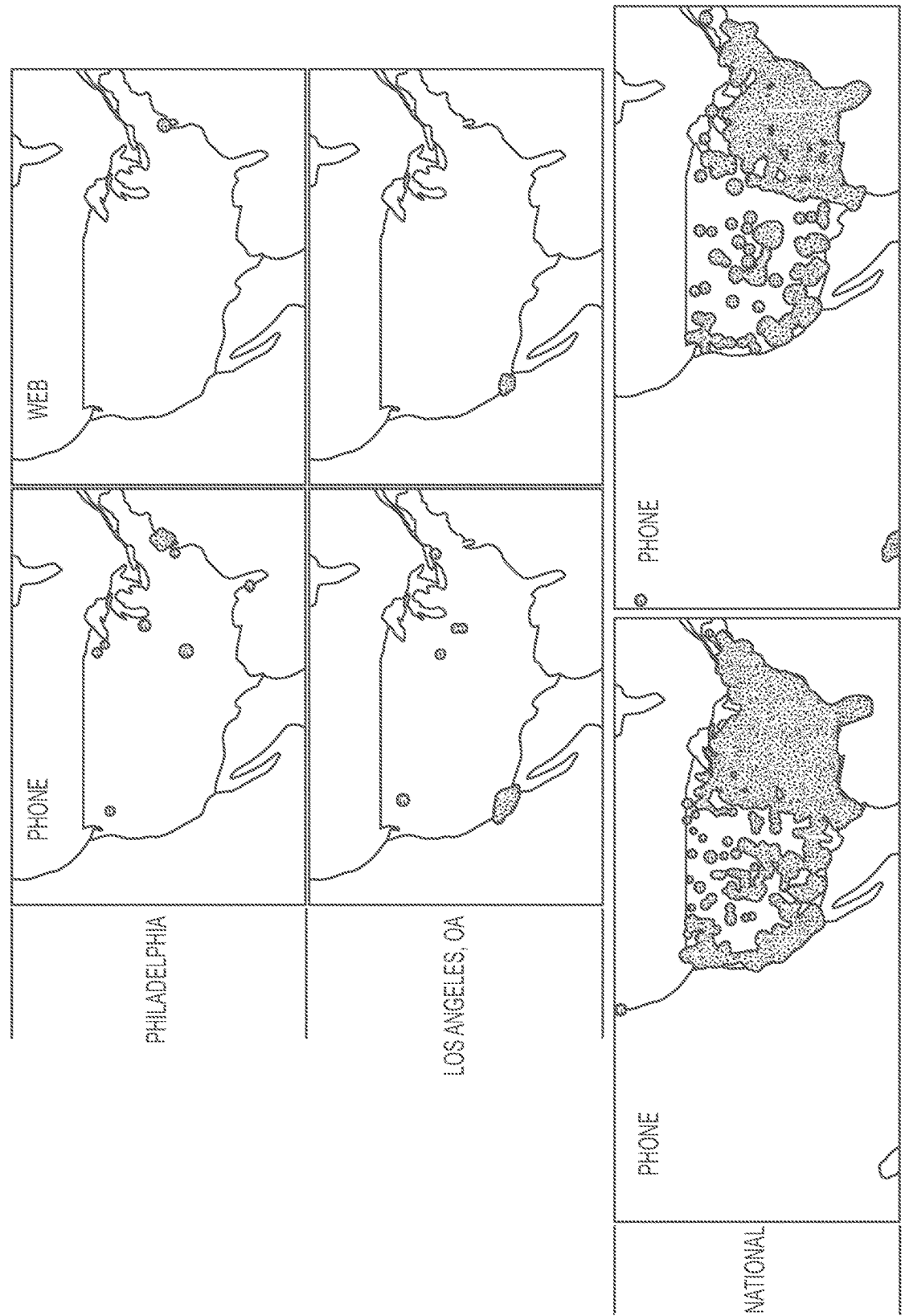
FIG. 5 shows phone orders and web orders for a product on a map.

Some examples of responses that are out-of-geo are shown in FIG. 5. This shows a broadcast in Philadelphia and Los Angeles. Phone responses are occurring in Philadelphia, and LA—but also other scattered locations around the country. Those other responses in the country are due to cell phone and shipping address location differences. In an example the attribution model actually only credits web responses that are occurring in their local broadcast region because the probability of an out-of-geo response is relatively low.

FIG. 5 also shows a national broadcast. This creates phone and web responses which span the entire country.

Although geography is a very important variable, it can also be erroneous due to data integrity errors. Some broadcasts are improperly labeled local, or may be improperly coded with strange values. When the Geography of the broadcast and response both match exactly, the probability of the spot being the correct for the response—in our data set—is high, but only 48%. Therefore this is a useful variable, but on its own is not definitive. For a national broadcast, a response occurring somewhere in the country only has a 4% chance of being due to the national broadcast. When there is no match at all, there is a 1% chance of the spot being correct.

B. Population

The total number of viewers reached by a television broadcast is also predictive as to the probability that a given response should be assigned to that spot. For example, if a very small television spot is run on the "Do It Yourself" channel, and another spot on "Fox", then it is more likely that the response is due to "Fox" because of its greater viewing audience. If a customer is picked at random, that customer would be more likely to have originated from "Fox".

Viewer population can be estimated by a variety of methods, including Nielsen panel data, which Indicates what percent of its panel was watching a particular program.

Figure 6:
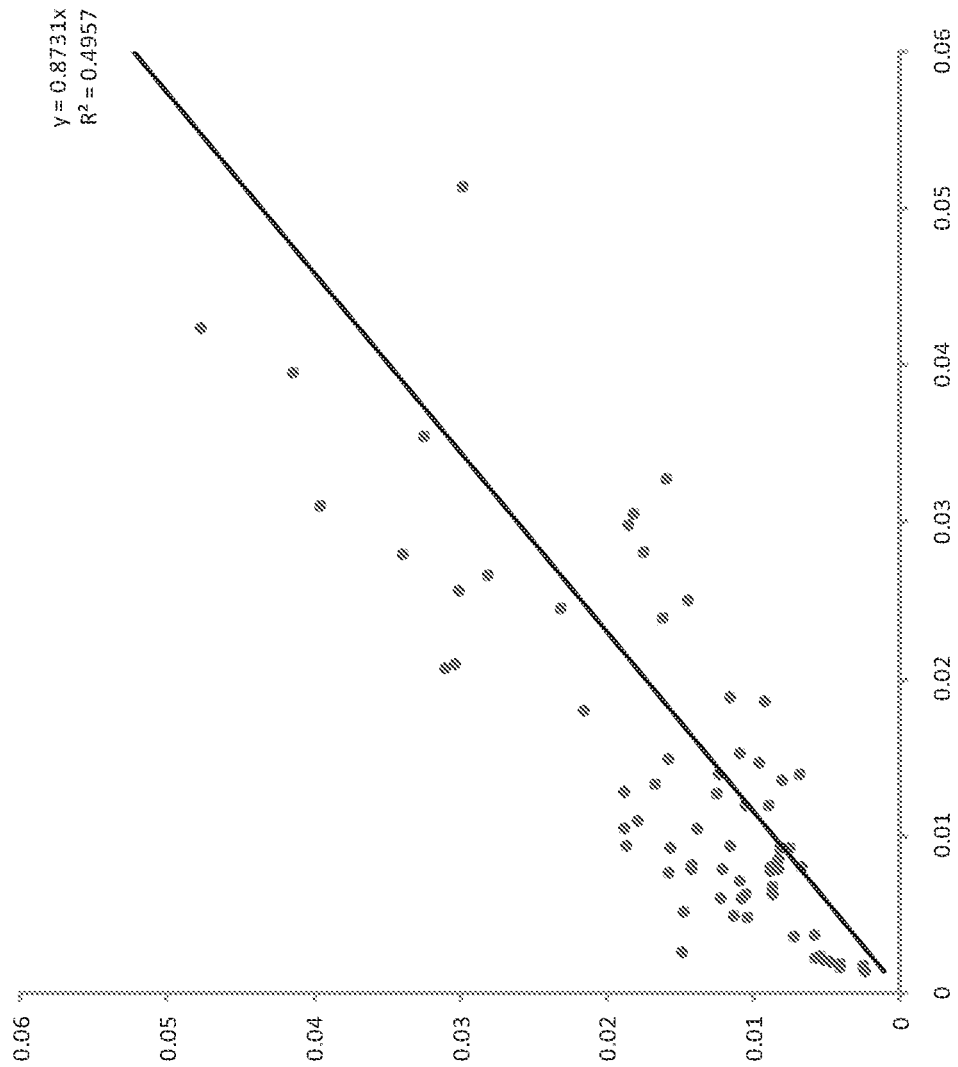
FIG. 6 is a graph of the relationship between viewership of television spots and responses.

FIG. 6 shows the relationship between viewership as a percentage of total viewership in a product of interest, to response as a percentage of total response, across television advertising projects. As viewership percentage increases, so does response percent.

C. Demographics

Each responding customer has certain attributes including their name, address, phone number, and various enriched demographics such as their age, gender, income, interest profile, and so on. Enriched demographics are available from a wide variety of sources including US Census data and companies such as Acxiom.

Customer demographics can be defined as $r_{i,Dj,k}$ where $D_j$ is the jth demographic variable for customer response i and product k. The system can enrich customer response data with a rich demographic vector. This in turn can be used for determining whether the customer is "like" the airing which is known.

The system can create an average profile for customers that have been linked to each television station program. For every television station program Si, $S_{i,Dj}$ is the jth demographic of the television station program $S_j$. Each station $S_j$ is equal to the sum of its constituent spot airings and the customers who were linked to those spots. Thus each station demographic profile is an average of the customer demographic vector who purchased from airings on the station.

An example of this kind of television station demographic profile is shown in the table in FIG. 4. This shows the most distinctive demographic traits for a particular station. Station profile for the "Do It Yourself" channel (call letters="DIY") with demographics ranked in order of highest z-score to lowest. DIY station watchers have interest in Woodworking, Hunting, Gardening, Sport and Liesure, tend to be male (Big and Tall Male apparel). They also own dogs and smoke at a higher rate than the rest of the population.

The disparity δ between the new responding customer and the television station program can be calculated as below. This will be used as a feature in the model for predicting the probability of the spot being correct for the response.

$$\delta(r_{i,Dj}, s_{i,Dj}) = |r_{i,Dj} - s_{i,Dj}|$$

Each spot has information about the station-program that it ran on, and so after quantifying the disparity above for every possible station-response, it is then possible to quantify the disparity for each response-spot.

In measuring the disparity between spot and customer response demographics, it is helpful to appropriately scale the variables to maximize the effectiveness of the match. Demographic variables range from ordinal values in the tens (e.g. age ranges from 18 . . . 80) to "has children" which is a two-value binary variable, 0.1. If the variables aren't scaled then in an L1-distance calculation, the age variable would tend to exert up around 50× more "weight" on the distance match than gender. Yet gender may be just as valuable as age. Because of this, the system standardizes each disparity to z-scores. The transformation is $$\Delta(r_i, s_i) = \frac{1}{J}\sum_j Z(r_{i,D_j}, s_{i,D_j})$$

where $$Z(r_{i,D_j}, s_{k,D_j}) = \frac{\delta(r_{i,D_j}, s_{k,D_j}) - \frac{1}{J}\sum_{i,k}\delta(r_{i,D_j}, s_{k,D_j})}{\sqrt{\frac{1}{J}\sum_{i,k}\left(\delta(r_{i,D_j}, s_{k,D_j}) - \frac{1}{J}\sum_{i,k}\delta(r_{i,D_j}, s_{k,D_j})\right)^2}}$$

Each demographic is compared against the distribution of its disparities to determine whether it is high or low compared to the norm for disparity.

D. Time

Time is one of the most important variables for determining which spot might have caused a particular response. As is the case in other credit assignment algorithms such as Q-learning, events that are closer in time to the response receive more credit.

A unique linking key makes it possible to observe responses that are tied to particular spots. However, because of some shared linking keys, the "lone spot" method is also employed on top of this basic technique to ensure that no drag orders or other issues are possible.

Figure 7:
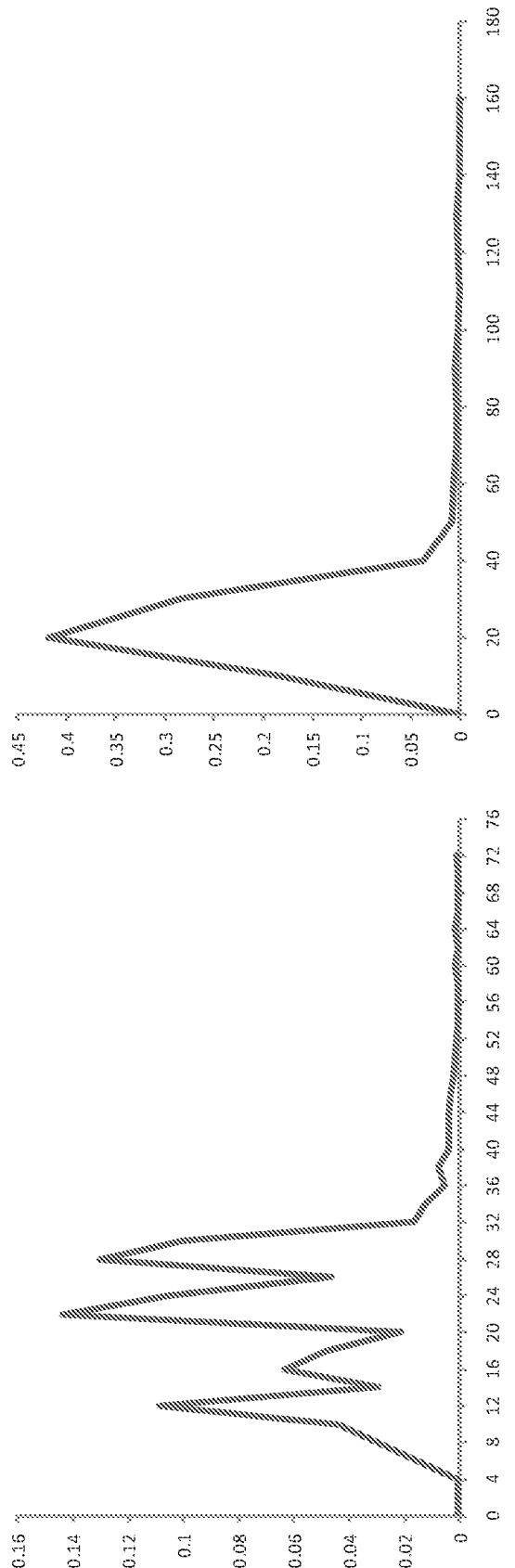
FIG. 7 shows two graphs with different time scales of the probability of receiving responses for a given number of minutes after airing of a television spot.

Based on this filtered set of spot and response pairs, the system can calculate the probability distribution of how quickly after an airing consumers respond, $Pr(r|r_d-S_d=T)$. The shape of this spot-response probability of response given time curve is shown in FIG. 7. This is shown for a 30 minute infomercial. Responses occur up until the 30th minute, and then decrease dramatically, with very few responses then after the 40th minute. The spikes are "call to actions" in the infomercial television advertisement in which the advertisement calls for the user to call-in to purchase the product. Call to action spikes occur at 12 minutes, 16 minutes, 22 minutes, 28 minutes. These results match previously reported by Danaher (1997), Lowen (1986) and Shields (1994).

VIII. Unknown Signal Identification

The television spots that are known about may not be a complete list of the marketing events that are running in the world. There may be other marketing events, including other television broadcasts, direct mail, and so on. There may also be organic web activity as people convert online. The method for identifying unknown spots is if the predicted highest probability of a spot being responsible for a response is lower than a threshold, then the system assumes that another unknown spot may be causing this response.

$$\text{Attribution}(r_i) = s_j: \max Pr(r_i | s_j),$$

if $\exists\ s_j: Pr(r_i | s_j) - \theta > 0$ = UNKNOWN, otherwise

It is possible to gather a little more information on the unknown spot. After identifying an unknown spot, the system has information about the kind of spot it was. Amongst other things the system knows:

1. The geography of the responder, and so the spot
2. The time of the response, and so approximately the time of the unknown spot
3. The demographics of the response, and so the spot.

Using this information the system can measure a discrepancy between known spots that are in the data. If this distance is larger than a threshold called the vigilance threshold V, the system can spawn a new unknown source S, which has centroid equal to the incoming response that has been measured as being different from other known and unknown spots in the code book (Duda and Hart, 1973), where the code book maps a high dimensional marketing event with a particular vector to a low dimensional representation. The threshold is a parameter that is an input provided to the system that is based upon user experience. If the threshold is set too high, the system will create too many new events, and if the threshold is set too low, the system will not attribute a response to an unknown source when performing the attributions, even when the probabilities are low that a known event caused the response.

If $\Delta(r_i,s_j)>V$ then $S^*_{n,D_j}=r_{i,D_j} \forall j$

This new spot Sn is literally a newly identified unknown source. In one embodiment, the system can use a single unknown source that represents all of the uncertainties. In one embodiment, the system can automatically multiple unknown sources based on how dissimilar the unknown sources are. Unknown sources are identified in an unsupervised manner using this algorithm, and so model the structure of the input data. Although unsupervised methods cannot be guaranteed to appropriately segment unidentified sources, they can regardless provide valuable insights into the presence of unknown sources, and this in turn can be reviewed by advertisers to determine if anything unusual is happening on the campaign.

The profile of the new spot is initially seeded with the profile of the response. After being initialized, the spot is optimized based on new responses that match to it so that it more closely represents these unidentified sources. The update operation for each dimension of the spot is as follows:

$$S^{*n,D_j}=\alpha(r_{i,D_j}-S^*_{n,D_j})$$

IX. Deployment Considerations

A. Automated Data Validation

In order to check for data problems an automated testing infrastructure has been developed that continually checks on data feed quality by running a range of tests. In one embodiment, checks are run periodically, for example, every twenty-four hours. Some common problems that have been identified include:

a) Incorrect Time zones, e.g., broadcast clock instead of local time
b) Time truncation, e.g., the minutes are rounded down to 00:00 resulting in a time-shift
c) Geographic location inaccuracies and errors, for example "Boston, Mass." might be typed in as "Boston".
d) Station standardization, e.g., "TruTV" may also be coded as "Tru".
e) Shared TFNs: The same Toll-Free-Numbers were improperly distributed to multiple stations.

Examples of validation tests are listed in FIG. 9. An example of the output from these tests is shown in the table in FIG. 8.

B. Attribution Model Flighting and Rapid Deployment

A common theme underlying success in data mining which has been highlighted by other successful data miners such as Kohavi is the need for rapid experimentation. A technical architecture has been developed for allowing fast iteration of models whilst ensuring that the production system is safeguarded. Model response-spot predictions can be recorded in a schema as Response (Responsekey, Spotkey, Probability)

This representation will be used to avoid moving code during a new model release. A second area is maintained—a modeling schema—where spot predictions are generated, and simultaneously flight multiple attribution models. The code in this area may not meet the same standard as for the production system. The code is available to analysts and can be modified in order to develop new models. In this schema results are written as AttributionPrediction (ResponseKey, Spotkey, ModelID, Probability).

Figure 16:
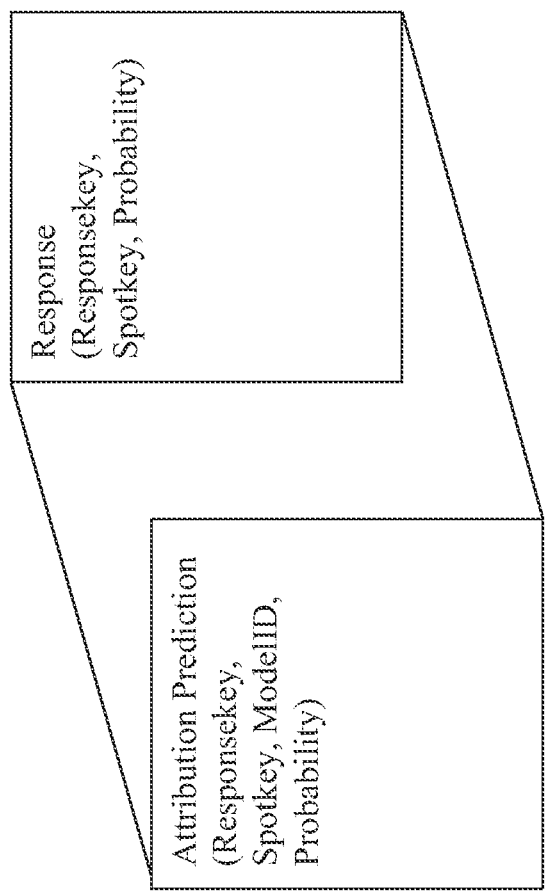
FIG. 16 shows a mapping of a response table to an attribution prediction table.

FIG. 16 shows the Response table used in production joined to a special AttributionPredicition table that contains new response and spot mappings.

Another table keeps track of the model that has been enabled for each project.

AttributionModel (modelid, projectkey)

The production system performs two steps:
1. It runs a default attribution model in production which populates a set of response-spot predictions. This code is designed to be reliable and is changed on a slower time-scale.
2. It then joins to the underlying AttributionPrediction table to retrieve model results. If model results are available in the proper format it will retrieve these results and use them in production. Every day AttributionPrediction is archived in an AttributionPredictonHistory table to ensure that model results can be tracked over time.

As a result of this architecture, releasing a new attribution model can be achieved without moving any code into the production system—keeping it safe and appropriately isolated whilst still allowing rapid iteration on models through a controlled Interface. This has increased our reliability and model release speed, whilst simultaneously supporting prototyping and model development which occurs in parallel with the production model.

C. Market and Media Standardization
  a. Many markets are improperly transcribed (e.g., "regional" etc). In addition, some known attribution projects should show 95% correlation between web and phone orders, and thus, around 95% attribution, however, geo-mismatch drops the attribution rate to 30%. In order to address these market mismatches the geomatch (or mismatch) is used as a factor in the model.
  b. Markets such as "San Diego" are often coded incorrectly, e.g., "San Diego, Calif.". The system maintains a market standardization table to map inconsistent forms into a canonical form. The system also corrects typographic errors and other problems. Corrections of this sort can result in 15% more matches.
  c. Television stations are similar, e.g., "TRUTV" and "TRU" are often both coded for the "Tru TV Station". The system maintains a station standardization table that works the same way as market.

D. Proportional selection
  a. This will (a) expose the underlying probabilities of different attribution probabilities, and (b) prevent simplistic attributions from resulting in customer questions. For the case where proportional selection is not used, the media event with the highest conditional probability is selected as the cause of the responses. While selecting this media event will give you maximum accuracy, it will fail to capture the distribution of probabilities of all other events. In contrast, proportional selection provides a distribution of probabilities that could have caused the responses. Thus, the distribution of probabilities may not be as accurate, but may be more informative. For example, a product advertiser may have a billboard and a television campaign advertising a product. Because the television campaign is more intense and uses a larger advertising budget, it has a higher probability of causing each response. In a report that does not use proportional selection, it would state that television is most likely producing all of the responses. However, by incorporating proportional selection, the system will generate a report that that television advertising is probably driving about 80% of the response, and the billboard is responsible for 20% of the response. While the numbers for the probabilities are not as accurate, the report may be more informative to the advertiser, perhaps confirming that the ad budget spent on the billboard is not wasted.
  b. Proportional selection might be defaulted to on, and depending upon the tuning phase and our calibration with the customer, the system could have it on or off depending upon the customer's preferences.

E. Handling of "Free" Advertising Events ("Bonus Spots")

If media cost is being used as a proxy for population viewership, then when advertising is provided for free, it can disrupt the model.
  a. In order to fix this the system can model and impute an estimated cost for the type of spot.
  b. In addition it is also possible to use viewership matrix instead.

F. Reason Codes

The algorithm can provide information on "why" a response was attributed or not attributed: A reason code should be given that provides for effective Interpretation and troubleshooting.
  a. Example: if response is attributed to spot it is because of reason 6 "Close-in-time-with-geomatch". If response is not attributed it is because of reason 7 "Geo-mismatch level 2 (regional cable detected)".
  b. Each reason code is an integer, and there is a mapping table of ModelReason in the Analytics schema.

X. Results

A. Web Attribution Rates Versus Web-TV Relatedness

Figure 10:
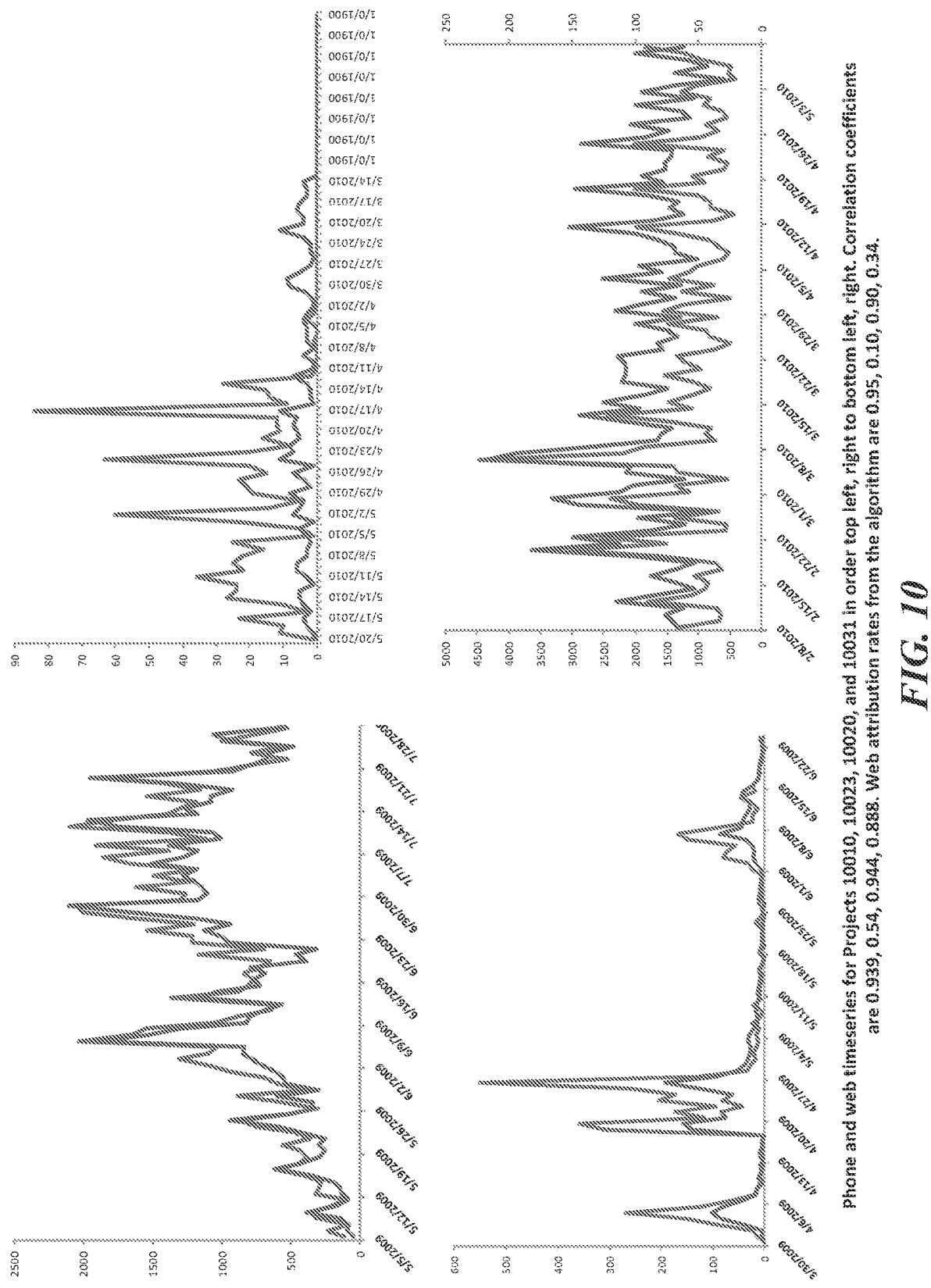
FIG. 10 shows phone orders and web orders for four different products.

FIG. 10 shows web timeseries versus phone timeseries for four projects in which TV phone response, TV media events, and web events were recorded. The correlation between TV events and web events was calculated, and then compared to the aggregated results of the spot-response algorithm which made micro-decisions on the same data. The table in FIG. 13 summarizes the results. In some projects the web timeseries are clearly correlated with phone timeseries, which is suggestive that the web responses are being driven by the television advertising almost exclusively. Projects 10010 and 10020, in particular, have phone and web timeseries with strong correlation coefficients (0.939 and 0.944 respectively). Web sales for these are attributed at a very high rate by the algorithm for these projects (95% and 90% respectively). This suggests that the response-spot algorithm is attributing about the right amount of web events to the cross-channel TV media events.

In contrast, a project with a weak correlation coefficient of 0.5427, for example, project 10023, shows only an attribution rate of 10%.

The web attribution percentage therefore appears to be correlated with the correlation coefficient, R, for the phone versus web timeseries, and the correlation coefficient R itself is a measure of the degree of relatedness between television and web activity. This is suggestive that the attribution algorithm, which looks at the underlying spots to determine the most probable one that resulted in a response, is properly estimating the degree of relationship between television and web and at least making good decisions in aggregate around the overall quantity of web sales that should be attributed.

B. Signal Separation

An interesting phenomenon was observed in which the web sales that the attribution algorithm attributed showed different spectral components. The top graph in FIG. 11 shows project 10031's original web timeseries, where the horizontal axis shows time in days, and the vertical axis shows the number of web sales. The original web timeseries can be decomposed into an attributed web timeseries (predicted to be due to TV) shown in the middle graph, and an unattributed web timeseries (due to unknown or organic web activity) shown in the bottom graph.

Figure 12:
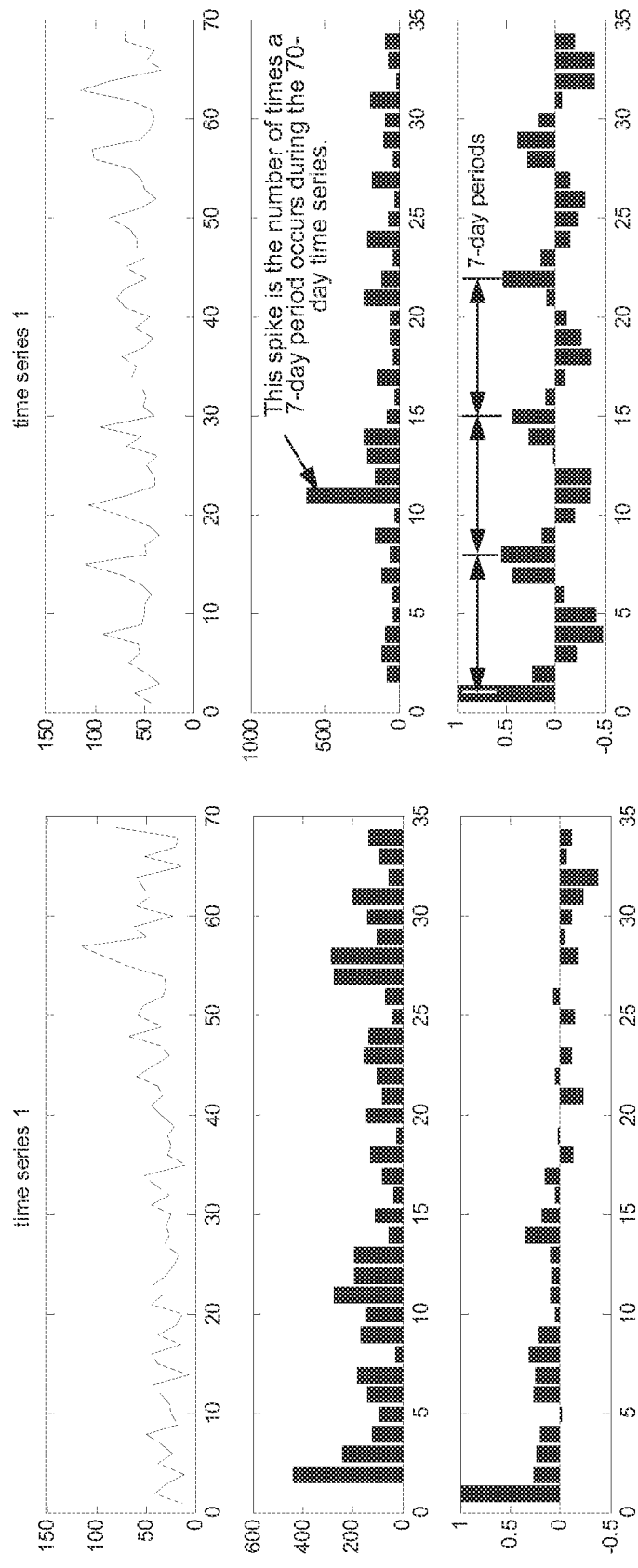
FIG. 12 shows a time series, Fourier periodogram, and auto-correlation plot for attributed and unattributed web orders.

The attributed and unattributed web timeseries and their respective analyses using Fourier analysis and auto-correlation are shown in FIG. 12. The data corresponding to the attributed timeseries is shown in the top left graph, and the data corresponding to the unattributed timeseries is shown in the top right graph. The Fourier analysis data or periodogram for each of the timeseries are shown in the middle graphs, and the auto-correlation plots for each of the timeseries are shown in the bottom graphs.

The unattributed timeseries is strongly periodic. In the Fourier periodogram, there is a spectral spike at 11 which corresponds to a large number of 7-day periods occurring during the 70-day long time series. Additionally, the auto-correlation plot shows a strong auto-correlation with a 7-day period. The traces of this 7-day period are missing entirely from the attributed web timeseries. Thus the web algorithm seems to have cleanly separated transient television-related web transactions, from web transactions that could be organic in nature. This kind of signal separation would be extremely useful for the web marketer, since it allows them to observe their web sales without being "contaminated" by the arbitrary effects of television. In order use this feature a web marketer simply uses the algorithm to tag the discrete web sales that were due to TV, and those which are not, and then looks at the timeseries of web sales that were not determined to be due to TV.

XI. Method and System for Calculating Aggregated Attribution Percentages

The system described herein can also calculate the total percent of conversions which should be attributed to each media event without calculating the individual media-response probabilities as described above These total percent of conversions calculations are independently useful and valuable for business owners. For example, these techniques can reveal that 90% of conversions occurring on the web may be due to TV advertisements which are typically not able to be linked to the web sale. This information alone would help a business owner determine how to allocate their advertising funds across different channels. Two embodiments for calculating the percent of conversions attributed to each media event are as follows.

A. Calculating Aggregate Attribution Percentages—Experimental Method

First, some number of geographies should receive the set of media events. Others do not receive these events. Next, measure the lift in the geographies due to the presence of the media events, holding as many other factors the same as possible. Finally, re-express the lift calculation as a percent of conversions due to the media events.

In one embodiment, several DMAs (Direct Marketing Association areas) were selected for the test and paired with control DMAs that had similar demographics. Demographic similarity was measured as L1 distance between aggregated census demographics for zip-codes in the targeted area. The top N DMAs that were closest to the demographics of the experimental DMA were selected as the controls.

As an additional control the performance of all of the other DMAs in the United States are also tracked. This helps to show whether any seasonal effects might have been occurring in the control groups.

Figure 14:
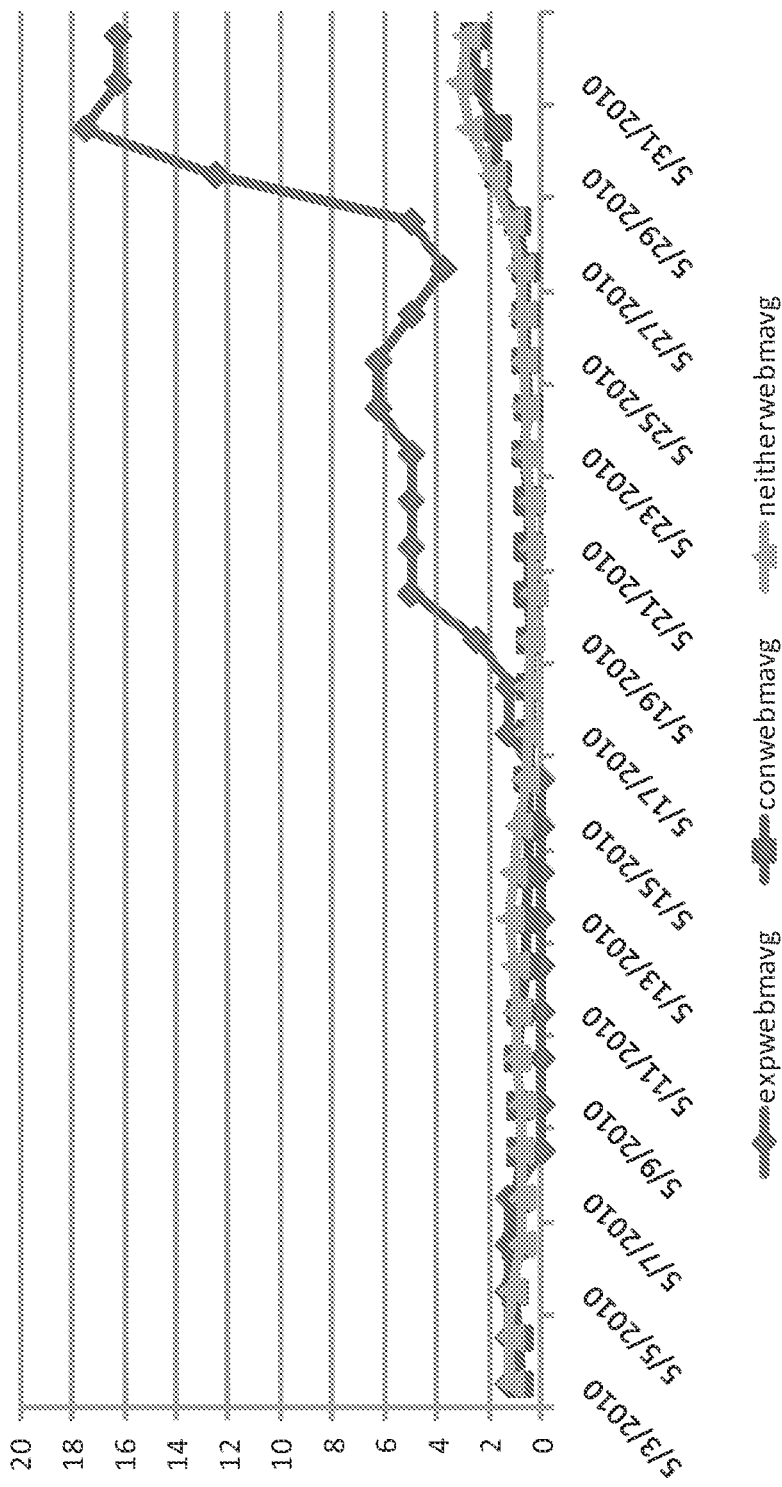
FIG. 14 shows a graph of web orders in targeted Direct Marketing Association geographical regions and control Direct Marketing Association geographical regions that did not have television advertising.

The results on web channel for this particular embodiment are shown in FIG. 14. The results are shown as a 7 day moving average because the retailer experienced highest sales on Saturday, and also because the web channel had experienced minimal sales prior to the test.

Prior to the test all test groups were normalized to their "baseline sales", which is the average of their web sales over a 3 week period.

During the May 17-24 period, the first phase, web sales Increased by approximately 6×. During the second phase beginning on May 24, a national television campaign was started which impacted the control markets. The control markets can be seen to lift by around 2.5-3×. However, the experimental market with local television increased even further. These lift results were statistically significant ($p<0.01$ Wilcoxon test).

Because incremental sales in the experimental market are most likely due to the additional media events (since that is the only factor that is different, and assuming that no mischievous time-varying factors differentially affecting the areas, nor locally specific factors, nor locally different advertising except the media events that were purposely differed), those incremental sales can be attributed to the media event that was applied. One possible calculation is as follows (assuming equally sized areas have been selected for test and control):

Given an observed lift, the correct attribution rate can be calculated as follows:

$$\text{Correct Attribution \%} = L/(1+L)$$

where $L=$(Sales-in-exp/Sales-in-control)

The attribution rate for the media aired the first week can be calculated as $6/(1+6)=85\%$. The subsequent lift during the second phase due to the national program was 16, so 94% attribution rate is determined for the nationally televised ads aired the second week.

Figure 15:
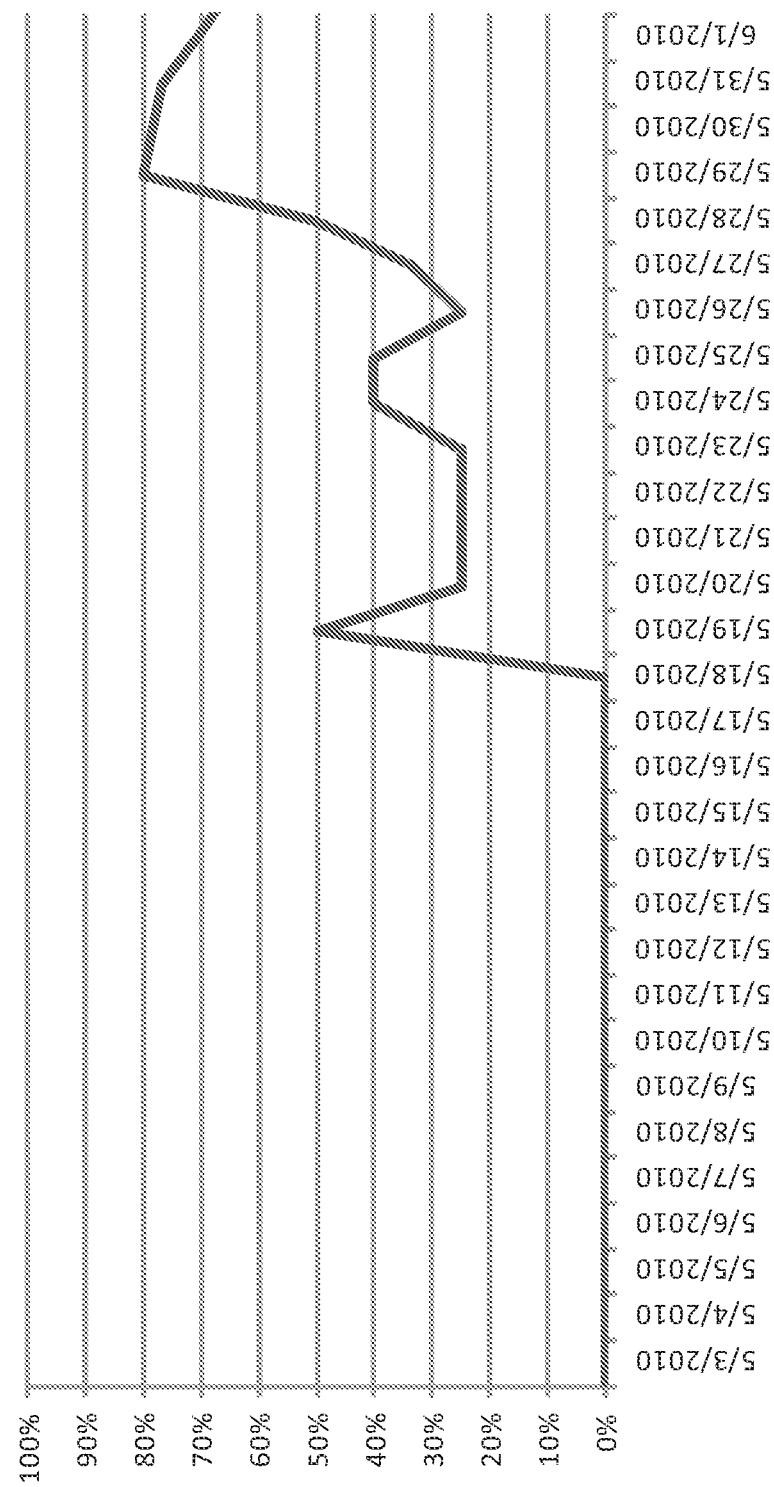
FIG. 15 shows a graph of determined web attribution rates.

The behavior of the response-spot probability estimation algorithm before and during the market test is shown in FIG. 15. After the first week of local television broadcasting, web attribution rate had increased to 30%. When national broadcasting ran in the second week, attribution rate increased to 80%.

The attribution rates calculated algorithmically are directionally correct with the lower bound attribution rates which were accessible because of the unique design of the experiment. However, they are lower than the actual attribution rates. In investigating why the attribution rates were lower, it was found that many of the media markets were improperly coded, and so were failing to match when a response originated in one of the targeted DMAs. Methods for standardizing market naming automatically and heuristically are discussed elsewhere in this patent.

B. Calculating Aggregate Attribution Percentages—Analysis of Variance Method

A second method for calculating the aggregate conversions that are attributed to each media event is to perform statistical analysis on historical data. This method requires some amount of historical data with the date of media, and the date of conversion events.

First, consider a response timeseries Conversions(t) and a media timeseries MediaEventOccurred01(t). Other media event timeseries are captured as OtherMediaEvent01(t). Align the timeseries variables by time, so that on the same day-hour there are total media placements MediaEventOccurred01(t), and total responses Conversions(t), and other ancillary media events that the system may be tracking OtherMediaEvent01(t). Next, a linear model is created that predicts, based on some media events, the number of conversion events that will result.

Let the model be of the form $$\text{Conversions}(t) = m*\text{MediaEventOccurred01}(t) + n*\text{OtherMediaEvent01}(t) + c$$

MediaEventOccurred01(t) is 1 when the media event occurred at time t, and 0 when it did not. OtherMediaEvent01(t) is 1 when another media event occurred, and 0 when it did not. Conversions(t) represents that a response or conversion occurred at time t. m, n and c are chosen so as to minimize the squared error for predicted conversions compared to actual, using the linear model above. Let E be the number of times during which the media event in question ran, ie. the count of times for which MediaEventOccurred01(t)=1. Let T be the total number of time units (eg. days or hours) when a media event may have been present or absent, ie. the cardinality of the set of times t. The total number of conversions due to the media event in question can be calculated as:

$$\text{PercentOfConversionsDueToMediaEvent} = (m*E) / (E*m + n*T*\text{mean}(\text{OtherMediaEvent01}(t)) + T*c)$$

XI. Reporting

The output of the system can be provided to the user in the form of a report. In one embodiment, the report can attribute conversion events to one or more unknown sources. In another embodiment, the report can Include only the conversion events attributed to known media events.

In one embodiment, the report can attribute one or more multi-channel media events to the provided conversion events. The report can be customized to filter in or out specific media events and/or media channels. For example, conversion events that appear in the web channel that have been identified as being due to a media event on television can be removed from the report in order to remove disruptive impact of television from the web channel.

These web conversion events can be shown as part of television media performance metrics. Performance metrics can include, but are not limited to, cost per acquisition (cost/conversion), revenue on advertising spend (revenue/cost), profit (revenue—cost), media efficiency ratio (MER) (revenue/cost). The MER for television airings incorporates the cross-channel effects that television is creating.

Typically, internet conversion tracking systems only attribute conversion events or gross sales back to media events. In contrast, the present system and method allows back-end monetary metrics such as net order value, contribution after cost of goods sold, payment defaults, returns, etc, to be included as conversion events, By rolling the back-end metrics back to the media events, a much more accurate assessment of the return on investment of the media can be obtained.

Further, when attributing lifetime event history to existing customers, some percentage of credit can be assigned to the original media event that helped to acquire the customer, and some percentage of credit can be given to more recent media events that generated a follow-on sale from the existing customer.

CONCLUSION

Tracking cross-channel effects due to television in an automated manner is a central problem of television advertising. Without quantification of television effects, marketers may misallocate budgets, sometimes with disastrous results. One anecdote from a diet company was that in 2009 they shut down television advertising due to the economic downturn and because the conversions couldn't be tracked. At the time it was an easy program to cut. After just 6 months all web conversions (a completely different channel which had been extremely successful and which they had spent a great deal of money on creative site design) disappeared. They had to re-activate their television budget to stay in business.

The methods presented herein use tell-tale signs from the responder to identify their most likely media event of origin including their proximity in time, geography, and demographics.

The method is general purpose and can be used for any marketing event. Tracking is a problem that affects numerous marketing channels including direct mail, print advertising, as well as television, and linking keys are typically used in those mediums as well to track small numbers of responders. The method should be extendible to these other mediums.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or Implementing the Invention.

We claim:

1. A computer-implemented method of attributing transaction events to streamed media instances, the method comprising:
   automatically aggregating and validating data feeds for each of a plurality of streamed media instances;
   determining, by a processor for each media instance of the plurality of streamed media instances, a first demographic profile of a plurality of viewers of the streamed media instance;
   determining, by the processor for each transaction event among a plurality of transaction events, a second demographic profile of a customer of the transaction event;
   determining, by the processor, for each transaction event, a probability that each transaction event is attributed to a streamed media instance among the plurality of streamed media instances based on a result of comparing each first demographic profile with each second demographic profile;
   upon determining that the probability that the transaction event is attributed to a streamed media instance among the plurality of streamed media instances is above a predetermined threshold, attributing, by the processor, the transaction event to the streamed media instance among the plurality of streamed media instances;
   generating a report including a plurality of transaction events that are attributable to one or more streamed media instances; and
   targeting a future streamed media instance not among the plurality of streamed media instances based on the probability that each transaction event is attributed to a streamed media instance among the plurality of streamed media-instances.

2. The method of claim 1, further comprising:
   upon determining that the probability that a transaction event is attributed to a streamed media instance among the plurality of streamed media instances is below a predetermined threshold:
      creating a new media instance not among the plurality of streamed media instances;
      attributing the transaction event to the new media instance; and
      setting a new demographic profile of the new media instance as the second demographic profile of the transaction event.

3. The method of claim 1, wherein a transaction event is at least one of a phone-in order, a web order, and a retail purchase transaction.

4. The method of claim 1, wherein a streamed media-instance is an advertisement provided on at least one of television, radio, Internet, billboard, print, and direct mail.

5. The method of claim 1, further comprising:
   attributing, for each transaction event, a first percentage of credit for a transaction event to a first streamed media instance, and attributing a second percentage of credit for the transaction event to a second streamed media instance.

6. The method of claim 1, wherein the probability that each transaction event is attributed to the streamed media instance among the plurality of streamed media instances is determined without a determination of an action by the customer of the transaction event with respect to the streamed media-instance.

7. The method of claim 1, wherein each of the plurality of streamed media instances is an online advertisement, and each of the plurality of transaction events is an offline transaction.

8. The method of claim 1, wherein each of the plurality of streamed media instances is an advertisement provided on at least one of television, radio, billboard, print, and direct mail, and each of the plurality of transaction events is an online transaction.

9. The method of claim 1, wherein the probability that each transaction event is attributed to the streamed media instance among the plurality of streamed media instances is determined without uniquely tracking a customer from a streamed media instance exposure to a transaction event transaction.

10. The method of claim 1, further comprising:
    comparing each first demographic profile of the plurality of streamed media-instances with each second demographic profile of the plurality of transaction events.

11. The method of claim 1, wherein determining the probability that the transaction event is attributed to the streamed media instance among the plurality of streamed media instances is further based geo-spatial statistics for the plurality of transaction events and the plurality of streamed media-instances.

12. The method of claim 1, wherein the probability that a transaction event is attributed to a streamed media instance among the plurality of streamed media instances is determined by a model, and the model is a supervised machine learning model including at least one of logistic regression, decision trees, and neural networks.

13. The method of claim 1, wherein the probability that a transaction event is attributed to a streamed media instance among the plurality of streamed media instances is determined by a model, and the model is generated based on a geographic area receiving a streamed media instance, a population estimated to have seen the streamed media instance, a time of the streamed media instance, and the demographics of the streamed media instance.

14. The method of claim 1, wherein a particular transaction event is not attributed to a particular streamed media instance when the probability that the particular transaction event is attributed to the particular streamed media instance is below a predetermined threshold.

15. The method of claim 14, further comprising:
generating a first report of the plurality of transaction events using the plurality of streamed media instances and the plurality of transaction events not attributed to at least one streamed media; and
generating a second report of only the plurality of transaction events attributed to streamed media instances of the plurality of streamed media instances.

16. The method of claim 14, wherein the predetermined threshold is determined by an aggregate statistics method.

17. The method of claim 13, further comprising:
monitoring accuracy of the model using known transaction event-streamed media instance pairs;
executing automated checks of the model on incoming data; and
triggering an alert if the accuracy is below a predefined value or if the incoming data is erroneous.

18. A system for attributing a plurality of transaction events to a plurality of streamed media instances, the system comprising:
at least one database configured for attributing a plurality of transaction events to a plurality of streamed media instances; and
a processor, communicatively coupled to the at least one database, and configured to:
automatically aggregate and validate data feeds for each of a plurality of streamed media instances;
determine, by a processor for each streamed media instance of the plurality of streamed media instances, a first demographic profile of a plurality of viewers of the streamed media instance;
determine, by the processor for each transaction event among a plurality of transaction events, a second demographic profile of a customer of the transaction event;
determine, by the processor, for each transaction event, a probability that each transaction event is attributed to a streamed media instance among the plurality of streamed media instances based on a result of comparing each first demographic profile with each second demographic profile;
upon determining that the probability that the transaction event is attributed to a streamed media instance among the plurality of streamed media instances is above a predetermined threshold, attribute, by the processor, the transaction event to the streamed media instance among the plurality of streamed media instances;
generate a report including a plurality of transaction events that are attributable to one or more streamed media instances; and
targeting a future streamed media instance not among the plurality of streamed media instances based on the probability that each transaction event is attributed to a streamed media instance among the plurality of streamed media-instances.

19. A non-transitory computer-useable medium storing a program for attributing a plurality of transaction events to a plurality of streamed media-instances, the program comprising instructions for causing a computer to perform a method for attributing a plurality of transaction events to a plurality of streamed media instances, the method comprising:
automatically aggregating and validating data feeds for each of a plurality of streamed media instances;
determining, by a processor for each streamed media instance of the plurality of streamed media instances, a first demographic profile of a plurality of viewers of the streamed media instance;
determining, by the processor for each transaction event among a plurality of transaction events, a second demographic profile of a customer of the transaction event;
determining, by the processor for each transaction event, a probability that each transaction event is attributed to a streamed media instance among the plurality of streamed media instances based on a result of comparing each first demographic profile with each second demographic profile;
upon determining that the probability that the transaction event is attributed to a streamed media instance among the plurality of streamed media instances is above a predetermined threshold, attributing, by the processor, the transaction event to the streamed media instance among the plurality of streamed media instances;
generating a report including a plurality of transaction events that are attributable to one or more streamed media instances; and
targeting a future streamed media instance not among the plurality of streamed media instances based on the probability that each transaction event is attributed to a streamed media instance among the plurality of streamed media-instances.

* * * * *